Dec. 12, 1950 A. S. GINSBURG 2,533,451

TAPPING MACHINE

Filed April 27, 1945 17 Sheets-Sheet 1

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 2

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 3

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 4

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 5

Inventor

ALBERT S. GINSBURG,

By C. E. Herrstrom & H. E. Thibodeau

Attorneys

Dec. 12, 1950

A. S. GINSBURG 2,533,451

TAPPING MACHINE

Filed April 27, 1945

17 Sheets-Sheet 6

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 7

Inventor

ALBERT S. GINSBURG,

By C. E. Herrstrom & A. E. Thibodeau

Attorneys

Dec. 12, 1950 A. S. GINSBURG 2,533,451

TAPPING MACHINE

Filed April 27, 1945 17 Sheets-Sheet 8

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 9

Inventor

ALBERT S. GINSBURG,

By C. E. Herrstrom & W. E. Thibodeau

Attorneys

Inventor
ALBERT S. GINSBURG,
By C. E. Herrstrom & W. E. Thibodeau
Attorneys

Dec. 12, 1950 A. S. GINSBURG 2,533,451

TAPPING MACHINE

Filed April 27, 1945 17 Sheets-Sheet 11

Inventor

ALBERT S. GINSBURG,

By C. E. Herrstrom & H. E. Thibodeau

Attorneys

Dec. 12, 1950 A. S. GINSBURG 2,533,451
TAPPING MACHINE
Filed April 27, 1945 17 Sheets-Sheet 12

Inventor
ALBERT S. GINSBURG,
By C. E. Herrstrom & A. E. Thibodeau
Attorneys

Dec. 12, 1950 | A. S. GINSBURG | 2,533,451

TAPPING MACHINE

Filed April 27, 1945 | 17 Sheets-Sheet 13

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 14

Inventor

ALBERT S. GINSBURG,

By C. E. Herrstrom & H. E. Thibodeau

Attorneys

Inventor

ALBERT S. GINSBURG,

By C. E. Herrstrom & W. E. Thibodeau

Attorneys

Dec. 12, 1950 A. S. GINSBURG 2,533,451

TAPPING MACHINE

Filed April 27, 1945 17 Sheets-Sheet 16

Inventor

ALBERT S. GINSBURG,

By C. E. Herrstrom + W. E. Thibodeau

Attorneys

Inventor
ALBERT S. GINSBURG,
By C. E. Herrstrom & W. E. Thibodeau
Attorneys

Patented Dec. 12, 1950

2,533,451

UNITED STATES PATENT OFFICE 2,533,451

TAPPING MACHINE

Albert S. Ginsburg, Chicago, Ill., assignor to La Salle Designing Company, Chicago, Ill., a partnership Application April 27, 1945, Serial No. 590,560

28 Claims. (Cl. 10—129)

This invention relates to a machine, more particularly to a machine for threading the stepped interior of the breech ring of large caliber guns.

The breech ring of most large caliber guns is provided with a threaded interior and such interior is closed by a threaded breech block. To permit rapid closing of the breech block in the breech ring, the interior of such breech ring is provided with an interrupted thread. However, to provide the greatest strength possible, it was found necessary to provide several series of threaded steps to obtain the maximum possible threaded engagement with the breech block. Such procedure is necessary in order to withstand the tremendous breech pressures developed in large caliber guns.

To any one skilled in the art it is readily apparent that threading each of these steps is a rather formidable task. Present day methods for machining the threads on the stepped interior of a breech ring utilize a conventional lathe which has been modified somewhat to permit this threading operation. Such modification consists primarily in employing a cam arrangement in the compound rest to effect transverse movement of the threading tool at the proper interval to clear each successive step on the interior of the breech ring. Threading of the stepped interior is otherwise accomplished in a more or less conventional manner.

Thus it is readily appreciated that threading such a stepped surface is necesasrily a slow procedure. Further, the accuracy of threads cut in this fashion is limited entirely by the accuracy of the lathe performing the operation. As there are numerous moving parts and consequently points of wear on such a machine, the accuracy of the finished product often leaves something to be desired. Furthermore, the skill of the operator of the threading machine likewise determines to a very considerable degree the accuracy of the finished product.

Obviously if the threads on the interior of the breech ring are not cut to a high degree of perfection, the corresponding threads of the breech block will not be in proper engagement. Then in order to obtain the close fit between the engaging threads necessary to withstand the tremendous pressure that such threads must resist, a very considerable amount of hand scraping and lapping will then be required to effect such fit.

Accordingly, it is an object of this invention to provide a machine for threading interior surfaces of a workpiece, for example, the stepped interior surfaces of the breech ring of a large caliber gun.

Another object of this invention is to provide a machine which will accurately thread the stepped interior of a breech ring of a large caliber gun to finished dimensions, eliminating any need for hand finishing.

Another object of this invention is to provide a step threading machine which automatically advances the thread cutting tool from one step to the next upon completion of the threading of the preceding step.

Another object of this invention is to provide a breech ring threading machine that can conveniently accommodate a variety of different diameter breech rings by the mere substitution of different sizes of thread cutting tools.

Another object of this invention is to provide a breech ring threading machine capable of cutting threads of different pitch on the stepped interior of breech rings.

A particular object of this invention is to provide a cutting tool assembly on a rotating spindle wherein the cutting tool may be incrementally advanced outwardly with respect to the spindle by increments as small as a thousandth of an inch.

Another object of this invention is to provide improved locking means to rigidly position a sliding work table upon the bed of a machine tool.

The specific nature of the invention as well as other objects and advantages thereof will clearly appear from a description of a preferred embodiment as shown in the accompanying drawings in which:

Fig. 3 is a top-elevational view of the breech ring threading machine.

Fig. 19 is a cross-sectional view of the driving arm utilized to effect reciprocation of the spindle and spindle body showing the arrangement of the hydraulic cylinder and indexing pin and in addition the amount of angular rotation of such driving arm necessary in threading each step of the stepped interior of the breech ring.

The breech ring threading machine to be described herein in more detail utilizes a reciprocating spindle vertically mounted in a suitable housing. Reciprocation of the spindle is obtained by a crank connected to a crank shaft which is driven by a suitable power source. A cutter head is secured to the end of the reciprocating spindle which holds a multi-toothed thread cutter. The reciprocation of the spindle is such as to permit the threading tool to describe an arc slightly greater than the angular extent of the step to be threaded. Mechanisms for automatically advancing the cutter into the workpiece are contained within the spindle and cutter head. Such mechanism retracts the cutter on each return stroke of the spindle. The lead of the thread being cut within the stepped interior of the breech ring is produced by a lead screw and nut affixed to the upper end of the reciprocating spindle. Thus as the spindle reciprocates, such spindle will also be raised and lowered an amount governed by the lead of the lead screw and accordingly reproducing such lead on the threads being cut.

The breech ring to be step threaded is a substantially cylindrical member and the specific ring chosen for purposes of illustrating the operation of this machine is one adapted to be assembled to an 8″ rifle. It should be understood however that this ring is only a specific example and that any cylindrical member having a stepped surface interior can be readily threaded or otherwise machined by this machine as will be presently described. The breech ring utilized herein is provided with a stepped interior having two sets of four steps, each set however being of different height. A low and a high step are provided adjacent each other and are disposed at 30 degree arcs about the inner periphery of the breech ring, each combination of steps being separated by an unthreaded notch to permit insertion of the breech block.

Figure 1:
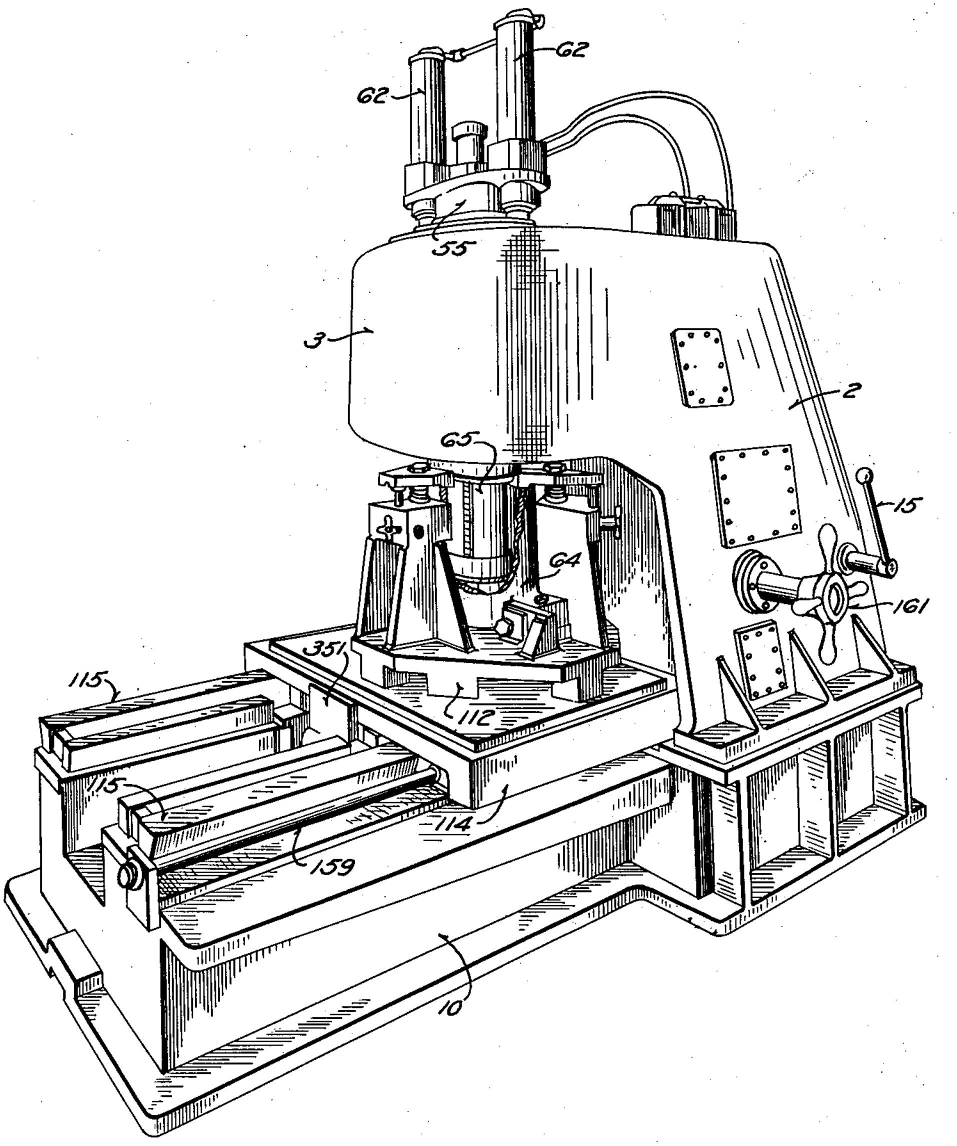
Fig. 1 is a perspective view of the machine utilized for threading the stepped interior of the breech ring of large caliber guns.
Figure 2:
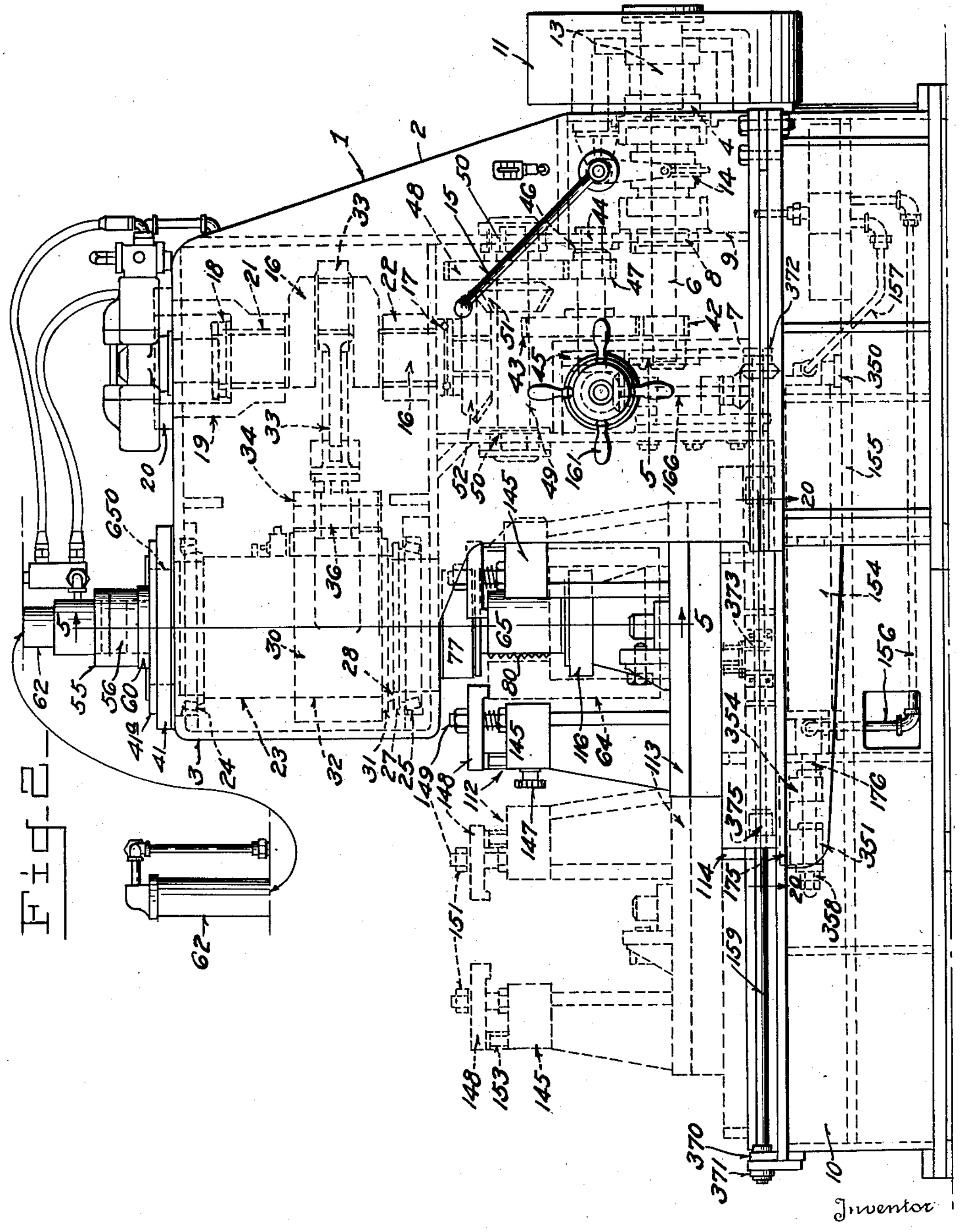
Fig. 2 is a side-elevational view of the breech ring threading machine.
Figure 2:
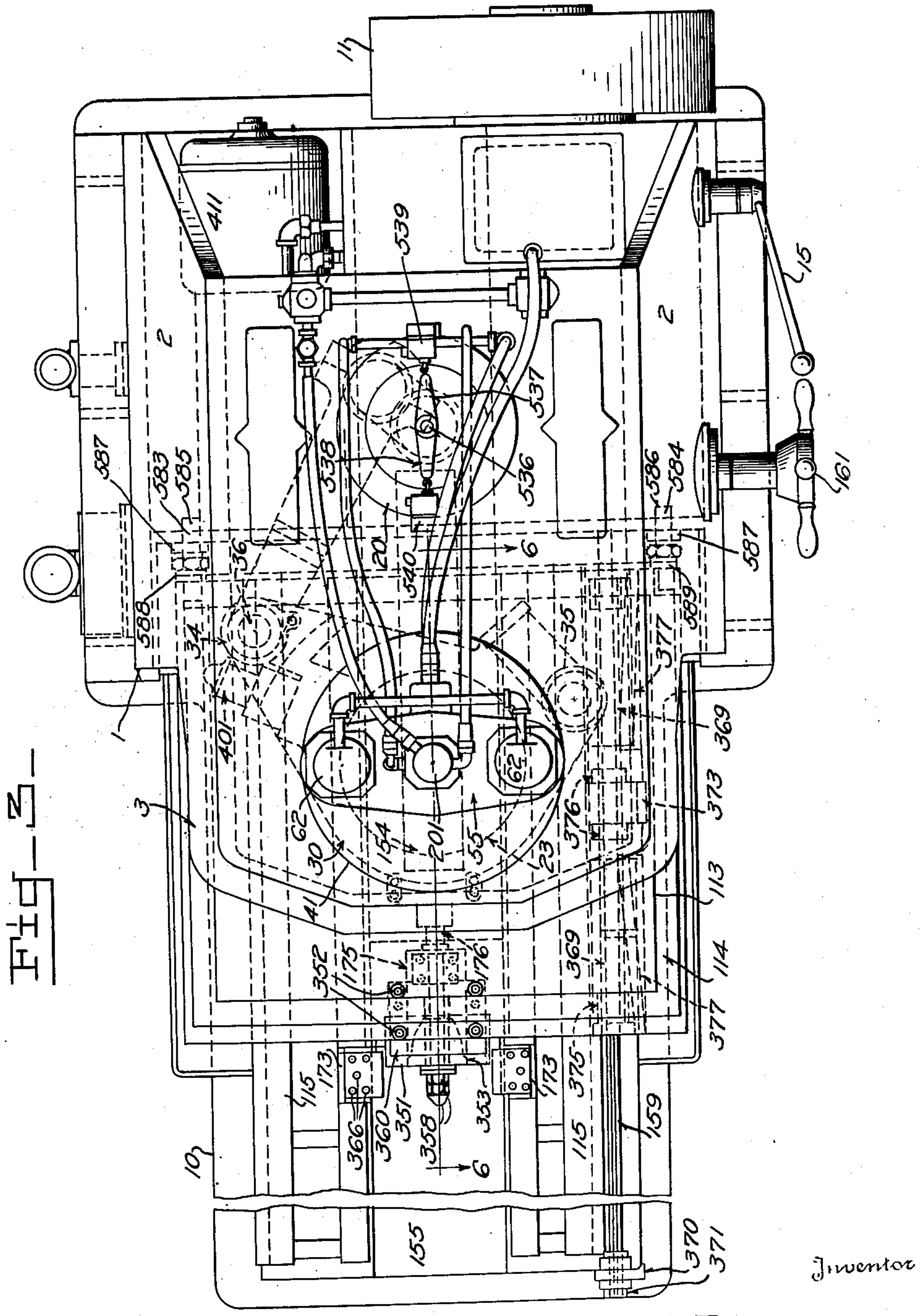

As shown in Figs. 1 and 2 the threading machine comprises a table 10 and a housing 1 mounted thereon. Such housing comprises a column 2 and an overhanging head 3 to mount and enclose the elements of the breech ring threading machine. The housing 1 may be either cast iron or preferably of welded steel plate construction and is secured to table 10 by suitable bolts. The table 10 is substantially rectangular in shape and is preferably constructed of welded steel plates. In the base of column 2 of housing 1 there is mounted in bearings 4 and 5 a horizontal shaft 6. The bearing 4 is suitably mounted and secured to one side of column 2 while bearing 5 is mounted on a suitable bracket 7 which is preferably welded to the base of column 2. The shaft 6 is supported at its midsection by another bearing 8 mounted in a web 9 provided on the inside of column 2. Adjacent the extreme right end of shaft 6, as viewed in Fig. 2, a combination flywheel and pulley 11 is mounted on a spindle 13 which is suitably supported in housing 1. The spindle 13 is connected to shaft 6 by a conventional clutch 14. The clutch 14 is mounted on the shaft 6 between the bearings 4 and 8. Clutch 14 is actuated by a lever 15 mounted on the outside of column 2. The pulley 11 is connected to a suitable power source (not shown).

A crank shaft 16 is vertically mounted in the upper end of column 2. The upper end of crank shaft 16 is supported by a bearing 18 which rests on the counterbored portion of a cylindrical bearing support 19 while the lower end of shaft 16 is supported by a thrust bearing 17. The bearing support 19 is provided with an integral flange 20 which rests on the top of head 3. An axial hole 21 is provided in bearing support 19 to receive crank shaft 16. The lower end of crank shaft 16 passes through a boss 22 preferably welded to the bottom of head 3. The crank shaft 16 is arranged to be driven by pulley 11 by means of a train of gears connecting shaft 6 with crank shaft 16. A spur gear 42 suitably keyed to shaft 6 connects with a gear 43 mounted on a shaft 44 which is supported in bearings 45 and 46 in bracket 7 and web 9 respectively. Another gear 47 on shaft 44 connects with a gear 48 mounted on a horizontal shaft 49 which is likewise supported in bearings 50 mounted in the outside wall of column 2 and the web 9. A bevel gear 51 is suitably keyed to shaft 49 and meshes with a bevel gear 52 on the end of crank shaft 16. Thus by means of these connecting gears power is transmitted from the power source to the crank shaft 16.

In the forward overhanging portion of head 3 there is vertically mounted a spindle body 23 which is rotatably supported at its upper and lower ends by bearings 24 and 25 respectively. The spindle body 23 is a hollow cylindrical member and houses a spindle 26. A ring 27 is placed on top of bearing 25 which surrounds spindle body 23 and is placed adjacent a shoulder 28 on the end of spindle body 23. Shoulder 28 is formed by a slightly reduced end diameter of the spindle body 23. About the periphery of spindle body 23 there are provided twelve evenly spaced, radially disposed, vertical slots 250 (Fig. 5), for a purpose to be later described. There are likewise provided twelve evenly spaced square headed pins 560 threaded into radial holes about the periphery of spindle body 23. Such pins are so positioned that two opposite corners of their squared heads are vertically disposed as shown in Fig. 6. Pins 560 are provided for indexing purposes to be later described.

A driving arm or sleeve 30 (Figs. 5 and 19) surrounds spindle body 23 and is supported on bearing 29. The bearing 29 (Fig. 5) surrounds spindle body 23 and is supported by ring 27. A ring 31 is preferably placed between driving arm 30 and bearing 29. Driving arm 30 (Fig. 19) is a prism shaped member provided with a large hole 32 for mounting such arm around spindle body 23. Two of the apexes 34 and 35 of the driving arm are bifurcated so that either may receive a connecting rod 33 between their bifurcated portions. The apexes 34 and 35 are each utilized as a point of application of driving forces from crank shaft 16 and are so spaced to permit two distinct degrees of reciprocation of the spindle as will be described. A transverse pin 36 inserted thru suitable vertical holes in each of the bifurcated apexes connects such rod to either apex 34 or 35. The other end of connecting rod 33 connects with crank shaft 16 in a conventional manner. Connection is made between the driving arm 30 and spindle body 23 by a pin-like end of a piston 400 extending from a hydraulic cylinder 401 mounted on driving arm 30 as shown in Fig. 19.

The hydraulic cylinder 401 (Figs. 3 and 19) is of conventional construction and is horizontally mounted within a recess 402 in driving arm 30. The recess 402 is bored in such fashion that the piston pin 400 extending out of cylinder 401 will be disposed radially with respect to the axis of spindle body 23. Hydraulic cylinder 401 is secured to driving arm 30 by suitable bolts. A conventional solenoid-operated, two-way valve 406 (Fig. 28) is connected to cylinder 401 and is operated by two solenoids 407 and 408 each respectively mounted at opposite ends of valve 406. When solenoid 407 is energized as will be later described, valve 406 is opened to permit hydraulic fluid to enter one end of hydraulic cylinder 401 thus forcing pin 400 outwardly into engagement with one of slots 250 in spindle body 23. When solenoid 407 is de-energized and solenoid 408 is energized, the direction of flow of hydraulic fluid is reversed. Such fluid enters the forward portion of cylinder 401 to reverse the direction of movement of hydraulic cylinder 401 which withdraws pin 400 from slot 250. The hydraulic fluid is supplied to valve 406 and to all other control valves by a pump 410 mounted on the base of the breech ring threading machine. The pump 410 is preferably driven by an electric motor 411 and the motor and pump are mounted on top of a suitable reservoir tank 412.

Spindle 26 is a cylindrical member and is mounted within spindle body 23. The spindle 26 is keyed to the spindle body 23 by two oppositely disposed keys 37 (Fig. 6) provided at each end of spindle 26. An axial hole 38 in spindle 26 is counterbored to receive a lead screw 39. The lower end of spindle 26 is of reduced diameter and is provided with threads 26*a* (Fig. 5) on which a cutter head 65, to be later described, is mounted.

The lead screw 39 is provided with an integral flange 39*a* near the lower edge thereof to vertically mount such screw within the upper counterbored portion of hole 38. Bolts 39*b* evenly spaced about the flange 39*a* secure the lead screw 39 to the spindle 26. An axial hole 39*c* is provided in lead screw 39 to receive a rack 203 therethrough to be later described. Threads 39*d* are provided on lead screw 39 which have a lead corresponding to the lead to be produced on the threads cut on the interior stepped surfaces of a breech ring 64. A split lead nut 40 is screwed onto threads 39*d* of lead screw 39. Lead nut 40 is split to provide convenient means for eliminating play or wear between the threads on nut 40 and lead screw 39. Bolts 40*a* connect the two halves of nut 40 and by tightening such bolts, nut 40 can readily be made to engage lead screw 39 substantially without backlash. The nut 40 is secured to a yoke 55 in a manner to be described.

A flange 41 (Figs. 5 and 6) is secured to the top of head 3 by suitable bolts and a large washer 41*a* is placed on top of flange 41. A hole 650 is provided in flange 41 and washer 41*a* to permit spindle 26 to be raised vertically thru head 3. On each side of hole 650 in flange 41 a guide shaft 53 is mounted in upstanding relation to flange 41. Each shaft 53 is secured to flange 41 by a tapered pin 54. The yoke 55 is provided on each end with a boss 56 and in addition a large centrally located boss 57. A suitable hole 58 is provided in each boss 56 to slidably mount the yoke 55 on the shafts 53. Two collars 59 and 60 are placed about each shaft 53 between washer 41*a* and boss 56 and are secured to each shaft 53 by suitable screws. The collars 59 and 60 are provided to permit adjustment of the height of cutter head 65 with respect to the breech ring 64 for proper location of the threads to be cut.

Figure 4:
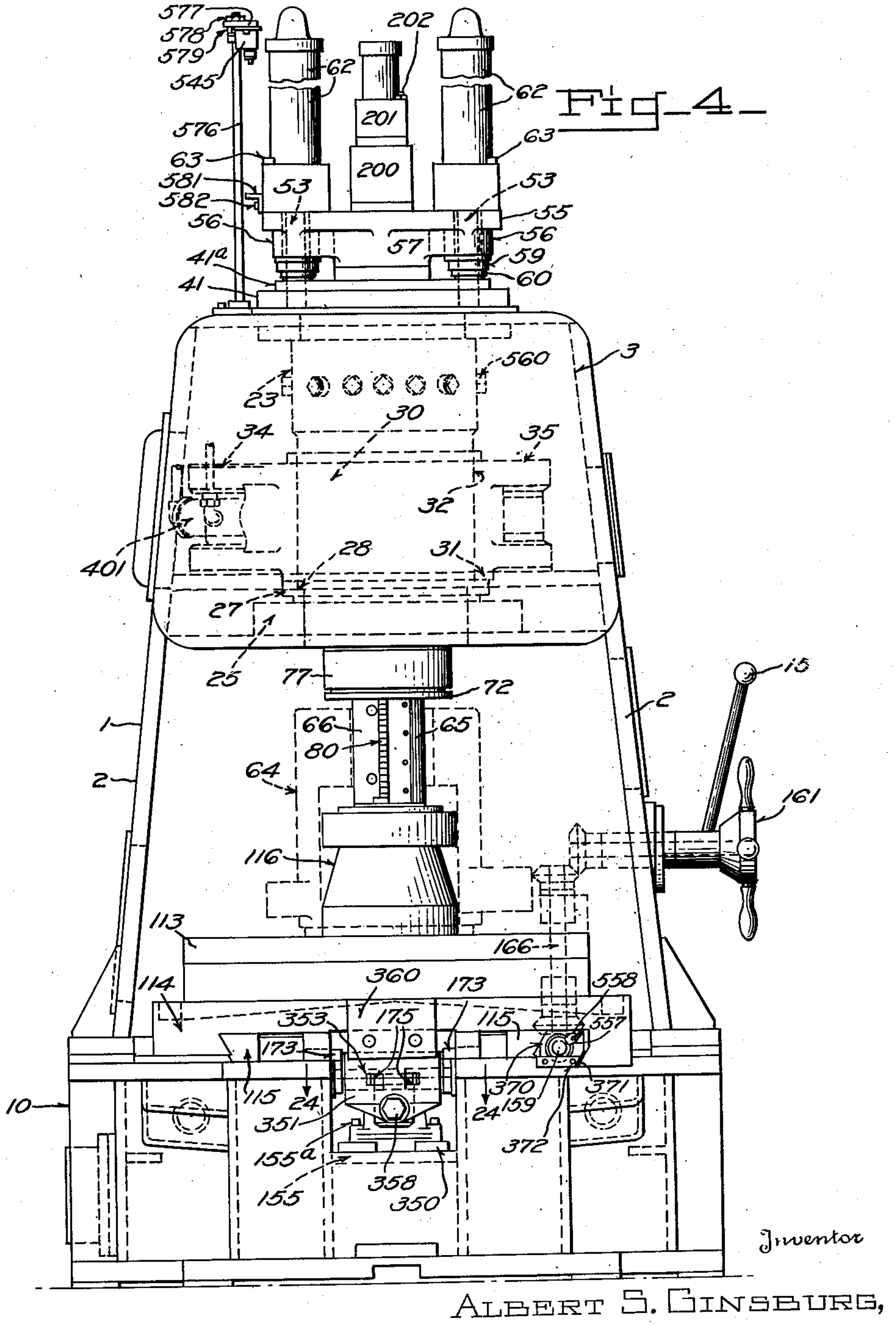
Fig. 4 is a front-elevational view of the breech ring threading machine.

On top of yoke 55 a pair of hydraulic cylinders 62 are provided respectively surrounding each of shafts 53 and secured to yoke 55 by bolts 63 (Fig. 4). The hydraulic cylinders 62 are of conventional structure and are provided to raise and lower spindle 26 and hence cutter head 65 in and out of cutting relationship with the workpiece as will be described. The lead nut 40 is secured to boss 57 on the underside of yoke 55 by bolts 61 which pass through suitable holes in yoke 55 and boss 51 and into suitably threaded holes in nut 40. Thus nut 40 is secured against turning as spindle body 23 and spindle 26 reciprocate within head 3 as will be later described.

For cutting threads on the stepped interior of the breech ring 64 of a large caliber gun, the cutter head 65 is secured to the bottom of spindle 26. Such head is a substantially cylindrical member comprising essentially a body portion 66 including a cutter 80 and an expansion member 68, an integral pilot portion 73 at the bottom of body portion 66, and a securing portion 74 at the top of body portion 66. An integral flange 72 is provided about the periphery of securing portion 74. Above flange 72 securing portion 74 is provided with exterior threads 75 on which is screwed a nut 77 which secures cutter head 65 to spindle 26. A circular shallow axial recess 300 is provided in securing portion 74 to receive an enlarged diameter disk-like end 301 of a pilot 76.

Pilot 76 is secured to cutter head 65 within recess 300 by bolts 69. In addition to the bolts 69, pilot 76 is further secured by two oppositely disposed keys 304 (Fig. 14) which are secured to the bottom of recess 300 by screws 305. Such keys project into corresponding key slots 306 in disk-like end 301 to securely lock pilot 76 to cutter head 65.

A longitudinal hole 78 is provided in cutter head 65 somewhat eccentric with respect to the longitudinal axis thereof in which is inserted an expansion member 68 to be presently described. A longitudinal slot 79 is provided in cutter head 65 to receive the cutter 80. At each end of slot 79 transverse holes 85 and 86 are provided through the body of the cutter head 65 for a purpose to be described.

Figure 11:
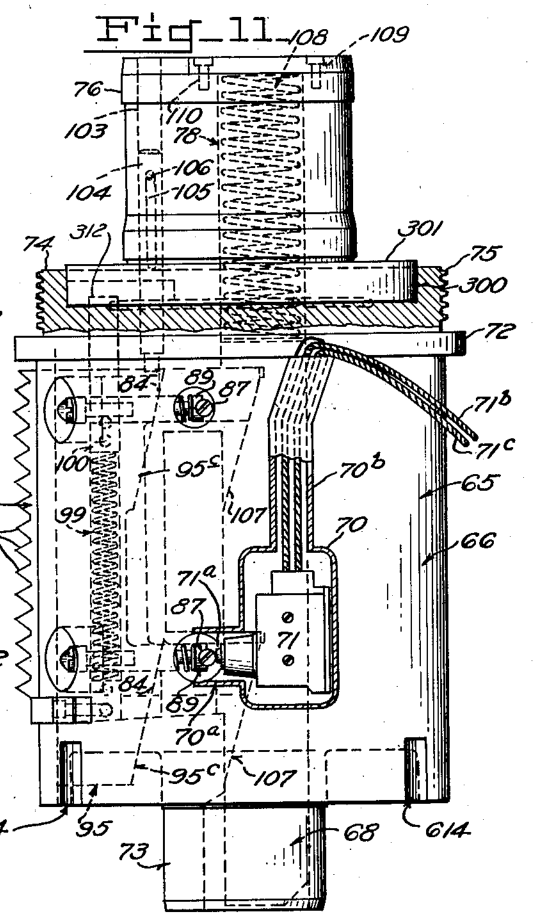
Fig. 11 is a detailed view of the cutter head similar to that shown in Fig. 10 but rotated 90 degrees to show a side view of the cutter and the position of the micro switch with relation to the cutter.

A substantially rectangular recess 70 is provided on the outside of body portion 66 adjacent transverse hole 85 as shown in Fig. 11. A transverse channel 70a connects recess 70 with hole 85. A conventional microswitch 71 is secured within recess 70 in such fashion that a contact plunger 71a thereof lies in the transverse channel 70a and projects into hole 85 where such plunger is engaged by a stud 87 as will be shortly described. A longitudinal shallow channel 70b in the periphery of body portion 66 extending from recess 70 to flange 72 provides a passageway for two lead wires 71b and 71c which connect microswitch 71 with a cutter feeding mechanism to be described.

Figures 12, 13:
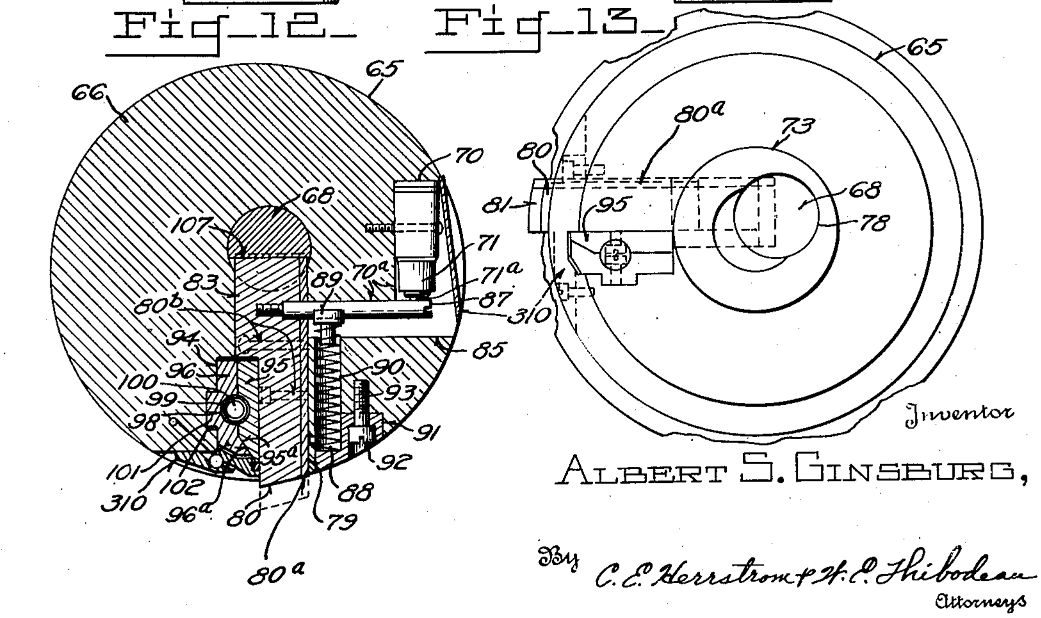
Fig. 12 is a cross-sectional view taken along the plane 12—12 of Fig. 10.
Fig. 13 is a bottom elevational view of Fig. 11.
Figure 27:
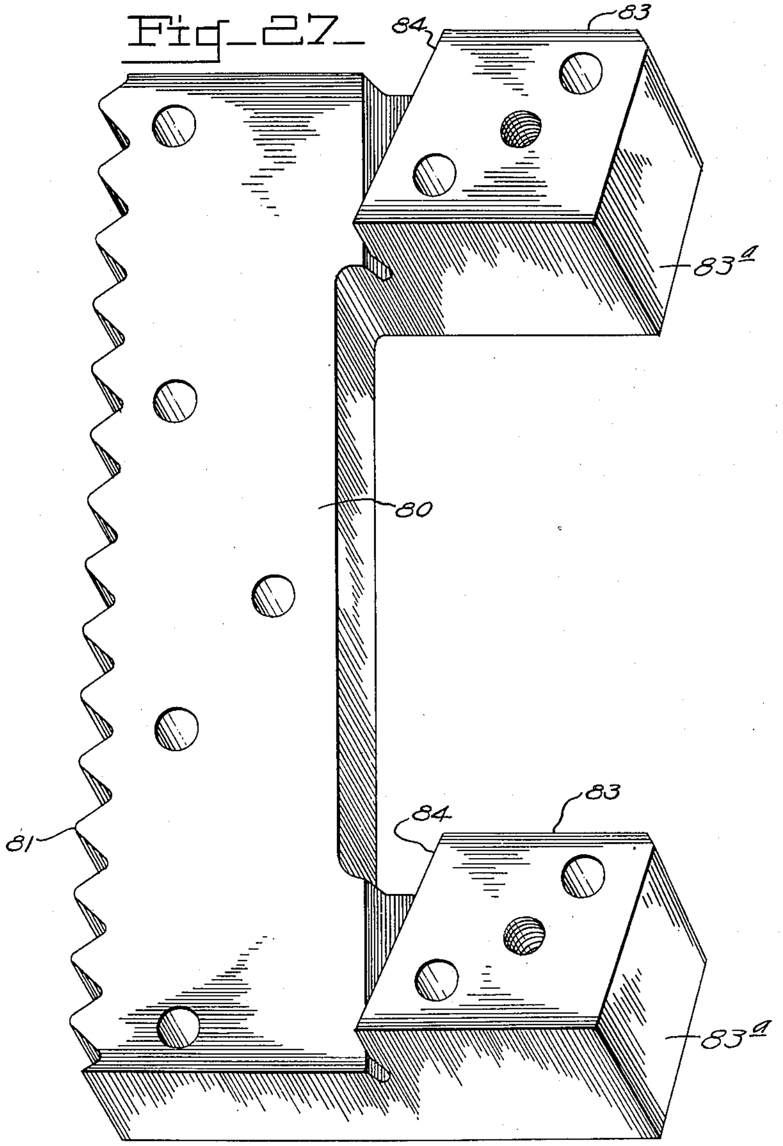
Fig. 27 is a perspective view of the cutter utilized for cutting the threads in the stepped interior of the breech ring.

The cutter 80 is a rectangular shaped member provided on one edge with a row of cutting teeth 81 conforming to the shape of the threads to be produced in the interior of the breech ring 64. On the edge opposite teeth 81 two integral projecting lugs 83 are provided. The bottom edges 83a of each lug 83 are sloped as shown in Fig. 27 so that cutter 80 may be forced outwardly by expansion of wedge member 68 as will be described. The inner portion of cutter 80 is of increased thickness as shown in Figs. 12 and 27. A sloped surface 84 is provided on each lug 83 at the shoulder formed by the juncture with the reduced thickness portion of cutter 80. Such sloped surfaces are engaged by a stop wedge 95 to permit feeding of cutter 80 into the workpiece as will be described. A shim 80a of substantial thickness is secured to the back of cutter 80 by a plurality of screws 80b. Shim 80a is formed of hardened steel and thus prevents excessive wear of the relatively soft cutter head under the impact stresses received in the threading operation.

Cutter 80 is inserted in slot 79 so that the center of each lug 83 is opposite the holes 85 and 86. The stud 87 is inserted through each of the holes 85 and 86 respectively and is screwed into a suitably threaded hole in each of the lugs 83. Two holes 88 parallel to one side of slot 79 are provided in cutter head 65 to receive plungers 89 which respectively engage each of the studs 87. A spring 90 surrounds each of plungers 89 to bias such plungers against studs 87. An off-center countersink 91 is provided for each hole 88 in which caps 92 are inserted to close the ends of holes 88 and retain plunger springs 90 within such holes. The caps 92 are respectively secured to body portion 66 by screws 93. Thus the spring biased plungers 89 act to force cutter 80 inwardly.

Figures 25, 26, 29:
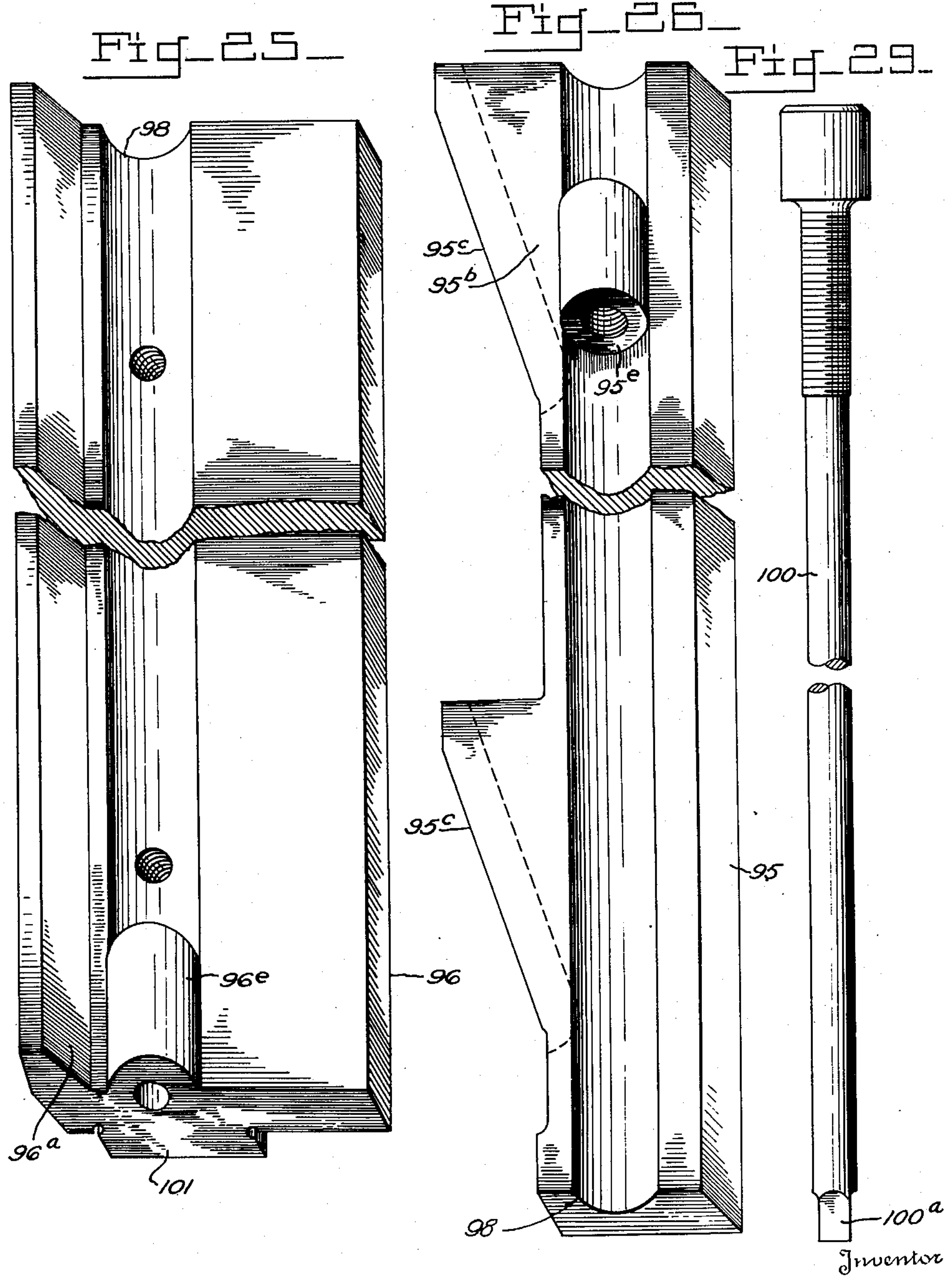
Fig. 25 is a perspective view of the fixed wedge member utilized for locking the cutter.
Fig. 26 is a perspective view of the movable wedge member utilized for locking the cutter.
Fig. 29 is a side elevational view of the guide rod utilized for guiding the wedge actuating spring.

In a longitudinal slot 94 in the side walls of slot 79 adjacent the reduced thickness portion of cutter 80, two wedges 95 and 96 having sloped cooperating wedge surfaces 95a and 96a respectively as shown in Figs. 12, 25, and 26 are mounted to securely hold the cutter 80 inwardly against the expansion member 68 and in addition prevent side play of the cutter. The wedge 95 is slidably mounted adjacent cutter 80 and is provided with two integral oppositely disposed lugs 95b. The lugs 95b have a sloped surface 95c, as shown in Fig. 11, which engage correspondingly sloped surfaces 84 on cutter 80.

A longitudinal substantially semi-cylindrical groove 98 is provided in each of the sliding wedges 95 and 96 in opposed relationship. An integral cylindrical lug 95e and 96e is provided on opposite ends of wedges 95 and 96 respectively as shown in Figs. 25 and 26. Lugs 95e and 96e slidably engage respective grooves 98 in wedges 96 and 95. Lug 95e is provided with a threaded axial hole in which there is screwed a guide rod 100. The lower end of such rod rests within an axial hole in lug 96e. The extreme lower end of rod 100 is squared as shown at 100a so that such rod can be readily turned by a wrench. A spring 99 surrounds rod 100 and abuts each lug 95e and 96e to retract wedge 95 as will be presently described.

The wedge 96 is provided with an integral longitudinal key 101 which engages a corresponding keyway 102 provided in the bottom of slot 94. Wedge 96 is rigidly secured in slot 94 by suitable transverse screws (not shown). Thus due to the inter-engagement of sloped surfaces 95a and 96a of the wedges, when wedge 95 is moved downwardly it will be rigidly locked against the side of cutter 80 and both radial and side movement of the cutter prevented. A vertical hole 312 is provided in cutter head 65 at the top of slot 94 directly over guide rod 100 which is mounted in the wedges 95 and 96. Hole 312 extends upwardly slightly into flange 301 of pilot member 76. Thus flange 301 serves to block off hole 312 in cutter head 65. Hole 312 in cutter head 65 provides clearance for the upper end of guide rod 100 when wedge 95 is permitted to raise upwardly under the bias of spring 99. The amount by which wedge 95 can be moved upwardly by spring 99 is thus limited by guide rod 100 striking flange 301. When cutter head 65 is in the raised position, as will be later described, guide rod 100 can be raised or lowered by turning guide rod in a counter-clockwise or clockwise direction. Such is accomplished by applying a suitable wrench to the squared end 100a of guide rod 100. As the lug 95e of wedge 95 is threaded and that portion of guide rod 100 which passes thru such lug is correspondingly threaded such rod can be raised or lowered by small increments. Thus the upward travel of wedge 95 can thereby be readily adjusted. A suitable cover 310 secured to body portion 66 by screws is preferably provided to exclude foreign matter from wedges 95 and 96.

Expansion member 68 comprises a shaft mounted in hole 78 of cutter head 65 and is provided with two notches 107 having sloped wedging surfaces arranged to engage the bottom sloped surfaces 83a on the lugs 83 of cutter 80. Expansion member 68 is biased downwardly by a spring 108 provided in the upper end of hole 78. Spring 108 is retained within hole 78 by a cap 109 secured to the top of pilot 76 by screws 110. Spring 108 biases expansion member 68 against a plunger 111 located in a centering member 116 as will be described later.

Figure 10:
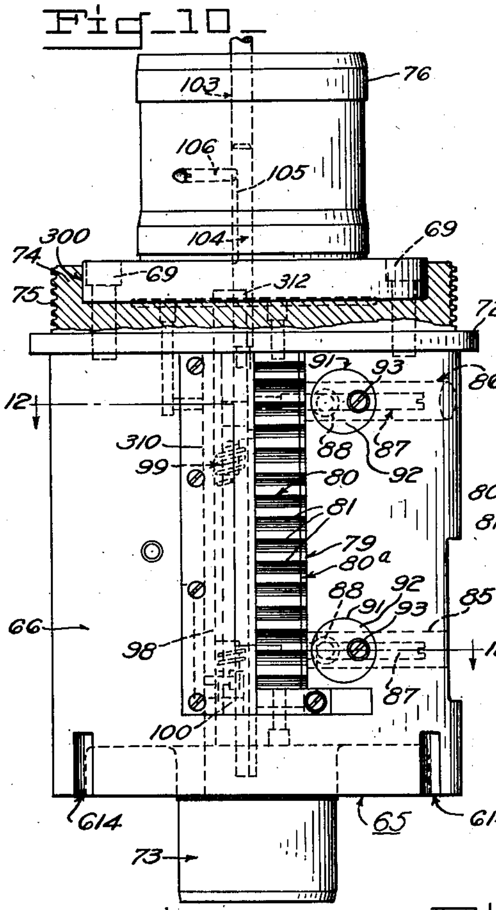
Fig. 10 is an enlarged detailed view of the cutter head shown in assembled relation wherein the front end of the cutter is shown.

A longitudinal hole 103 is provided in pilot 76 near one edge thereof which communicates with the lower corner of slot 79 and cutter head 65. A plunger 104 is inserted in hole 103 and engages the upper corner of the wedge 95 as shown in Figs. 10 and 11. A longitudinal slot 105 is provided in plunger 104 which is engaged by a transverse screw 106 to retain plunger 104 within the hole 103. A plunger 210 (Fig. 6) extending downwardly from the cutter feeding mechanism engages the upper end of plunger 104 to move wedge 95 downwardly against the bias of spring 99 as will be later described.

Cutter head 65 is secured to the lower end of spindle 26 by a nut 77. The nut 77 is provided with an integral inwardly projecting flange 309. Such flange snugly surrounds the lower reduced diameter end of spindle 26. Nut 77 is retained on spindle 26 by a threaded ring 308 screwed onto the threaded portion provided on the lower end of spindle 26. The ring 308 thus provides a shoulder for flanged nut 77 to engage. Two oppositely disposed keys 307 secured to the lower end of spindle 26 by screws 303 engage corresponding key slots 306 provided in pilot 76 when cutter head 65 is mounted on the end of spindle 26. The nut 77 is then screwed onto the threads 75 of cutter head 65 which draws cutter head 65 tightly against spindle 26. The keys 307 positively lock cutter head 65 on spindle 26.

On the underside of head 3 adjacent cutter head 65, there is mounted a pull-type solenoid 600. Such solenoid is secured to the underside of head 3 by a plurality of screws 601. A horizontal arm 602 is pivotally mounted to a bracket 603 by a pin 604. A spring 605 connects the armature of solenoid 600 with one end of arm 602. A spring 606 oppositely disposed to spring 605 connects the same end of arm 602 to a stud 607. Springs 605 and 606 are provided for a purpose to be presently described. On the other end of arm 602, there is mounted a normally closed micro-switch 608. Such micro-switch is secured to the end of arm 602 by screws 609.

Figure 23:
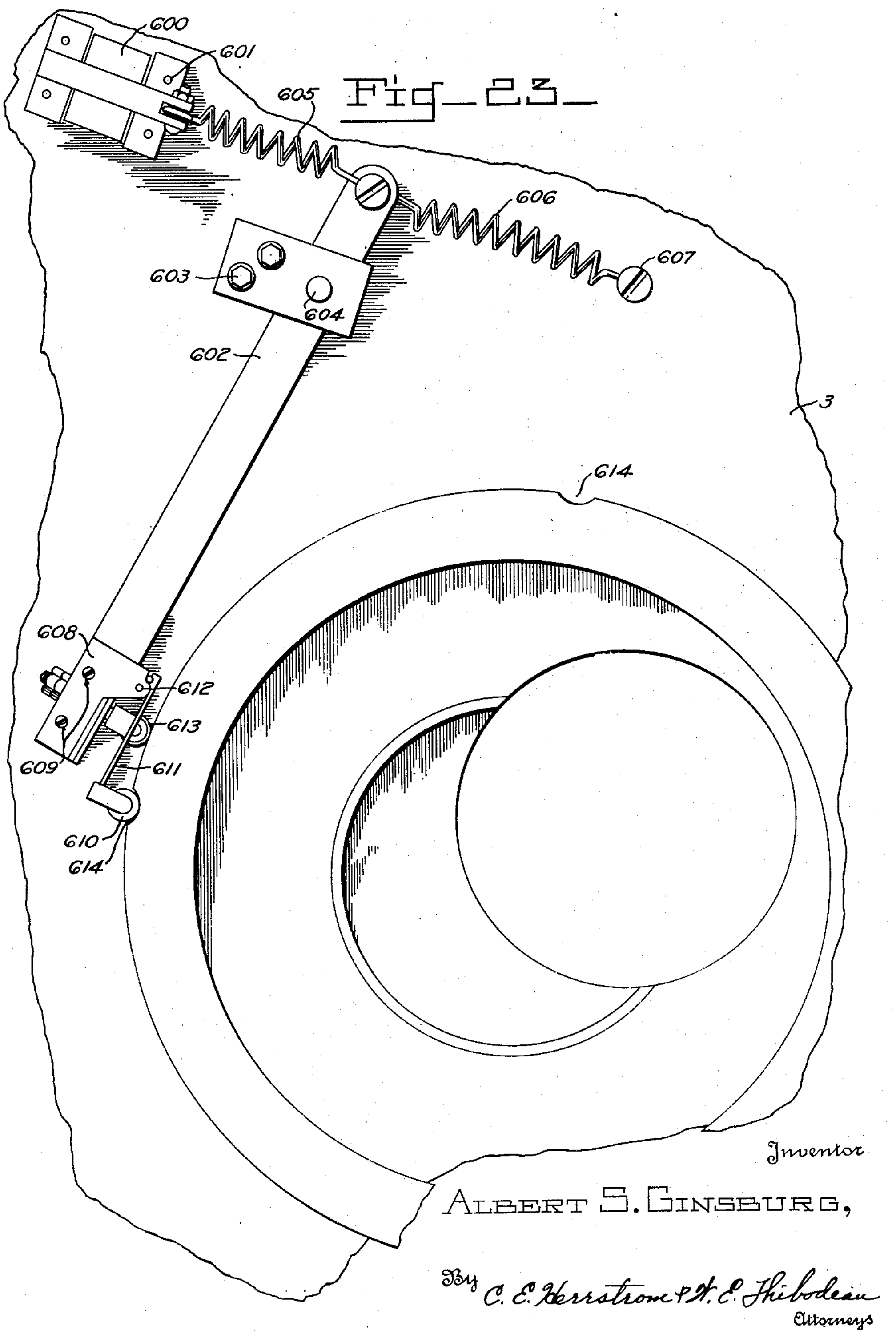
Fig. 23 is a partial, bottom-elevational view of head 3 showing the arrangement of the pull-type solenoid utilized to swing the micro switch into contact with the cam depressions in the cutter head.

When solenoid 600 is de-energized, spring 606 biases arm 602 in a clockwise direction as shown in Fig. 23 so that micro-switch 608 is out of the path of cutter head 65. When solenoid 600 is energized however, in a manner to be described later, the armature of such solenoid is pulled inwardly which forces arm 602 to swing in a counterclockwise direction bringing a roller 610 into contact with the outside surface of cutter head 65. The roller 610 of micro-switch 608 is mounted on the end of an actuating arm 611 and such arm is pivotally mounted on micro-switch 608 by a pin 612. Roller 610 mounted on arm 611, is the actuator roller to open and close the electrical circuit. A secondary bearing roller 613 is suitably mounted on micro-switch 608 which likewise engages the outer surface of cutter head 65.

The solenoid operated micro-switch 608, above described, is provided to predetermine the position of the cutter blade 80 in cutter head 65 with respect to the steps of the interior of workpiece 64. Such positioning is effected when the roller 610 of micro-switch 608 engages substantially semi-cylindrical cam notches 614 provided near the lower edge of cutter head 65 as shown in Figs. 10, 11, and 23. When cutting the stepped interior of a particular breech ring there may be, for example, four major diameter and four minor diameter steps in such ring. Accordingly, there are provided the four notches 614 so spaced that only when the cutter blade is in proper angular location to be lowered into cutting position with a major diameter step, can the cutter head 65 be so lowered. The matter of positioning such cutter blade in proper radial alignment with one of the steps in breech ring 64 will be described later. There are preferably provided two cutter heads 65, one of which is utilized to cut the major diameter steps and the other to cut the minor diameter steps. Similar cam notches are provided on the minor diameter head for positioning the cutter blade in a manner as described above.

A hydraulic cylinder 201 is secured to the top of yoke 55 in the center thereof by bolts 202. A piston 201a (Fig. 17) contained within hydraulic cylinder 201 engages the upper end of rack 203 for a purpose to be presently described. The cutter 80 is advanced into the workpiece, for example, the breech ring 64, by small increments with each reciprocation of the cutter head 65 by the action of a mechanical device. The mechanical device utilized for such advancement of the cutter is contained within a substantially rectangular box 200 placed on the head 3 of the breech ring threading machine. The box 200 (Figs. 16, 17, and 18) is of welded plate construction and is provided with a removable cover 500 which is secured to the top of box 200 by screws 501. The box 200 is secured to yoke 55 and to spindle 26 by a plurality of bolts 502.

Figures 16, 17, 18:
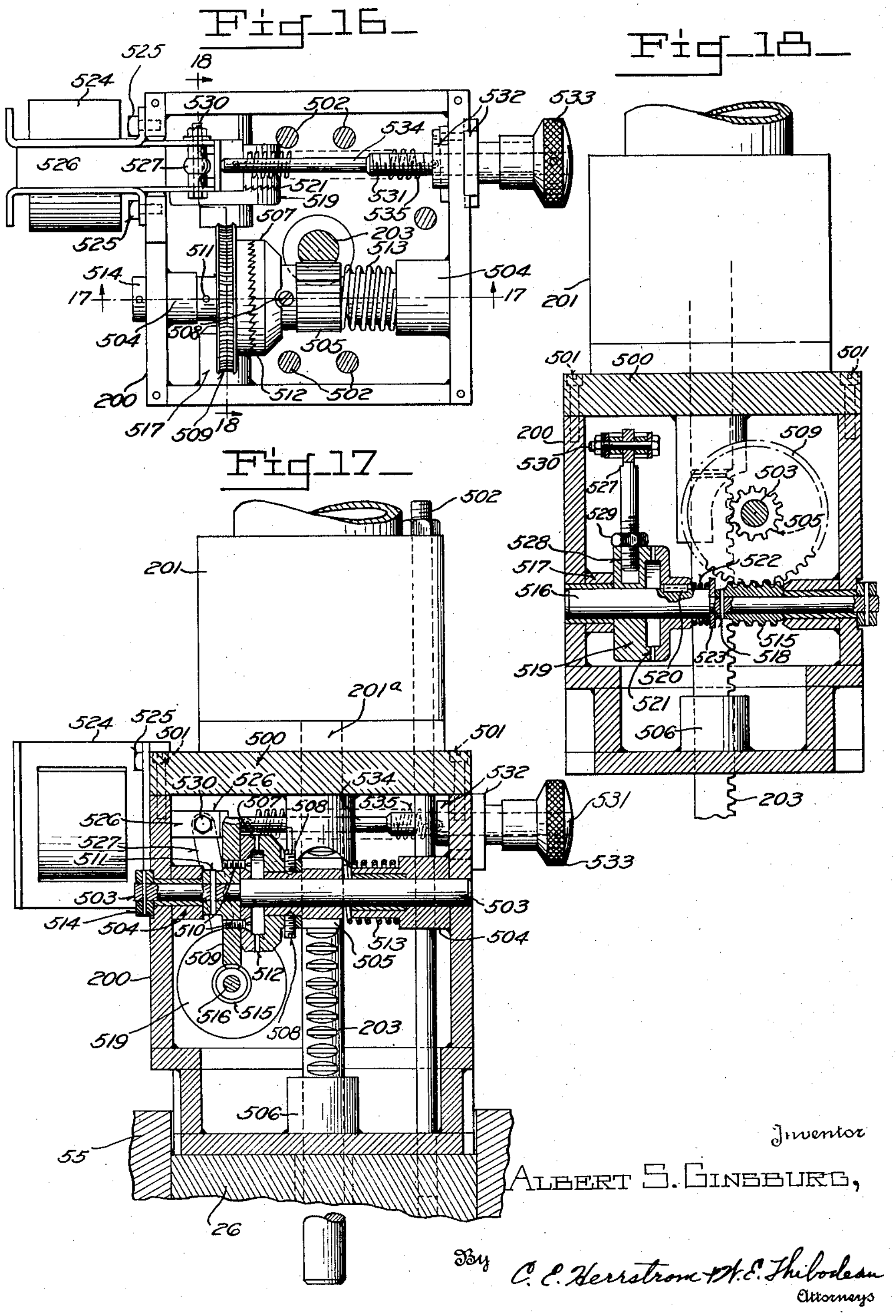
Fig. 16 is a top elevational view of the box utilized to house the cutter feeding mechanism shown with the top removed to show the arrangement of such mechanism.
Fig. 17 is a longitudinal-sectional view taken along the plane 17—17 of Fig. 16.
Fig. 18 is a longitudinal-sectional view taken along the plane 18—18 of Fig. 16.
Figure 13:
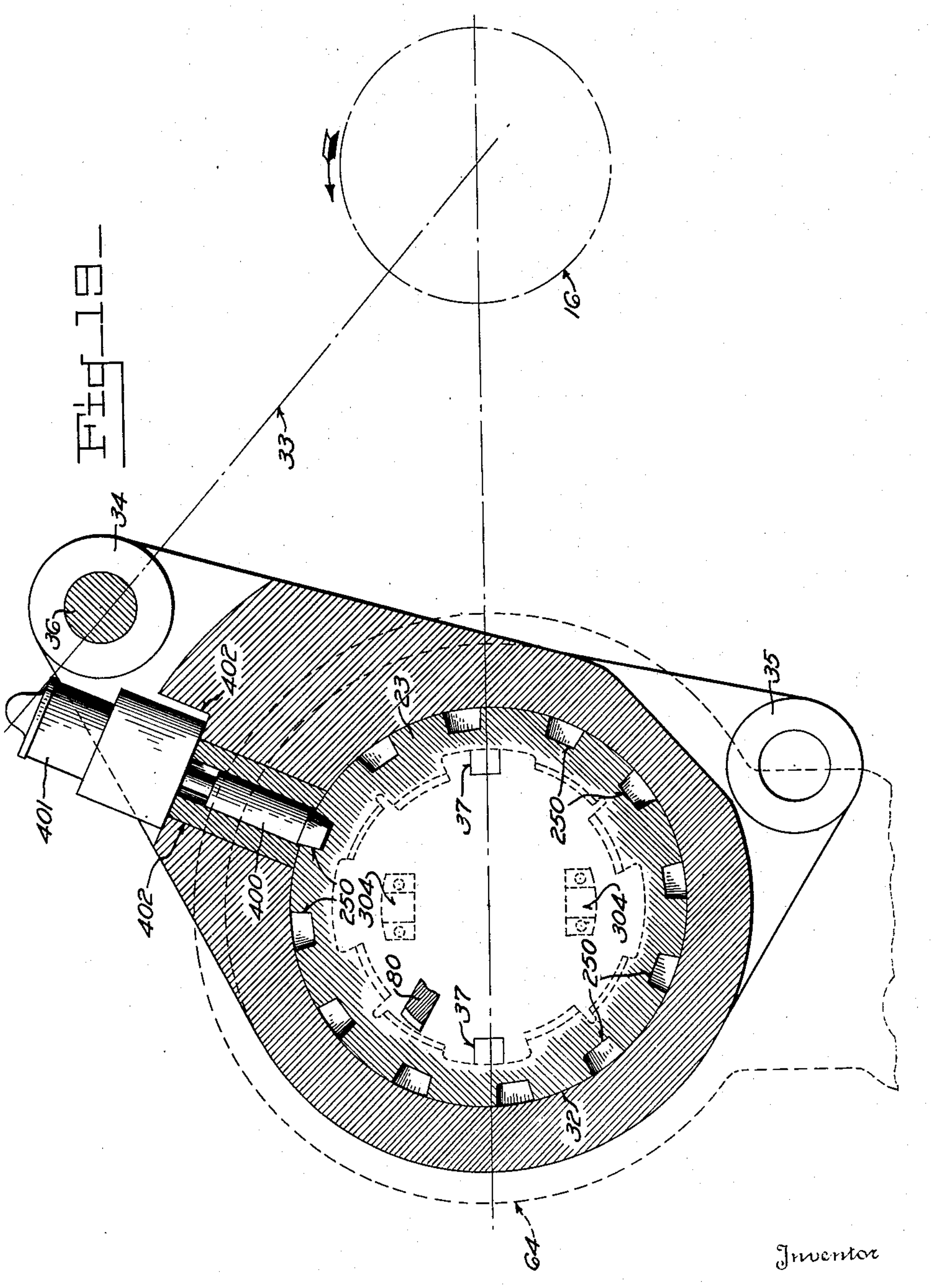
Figure 21:
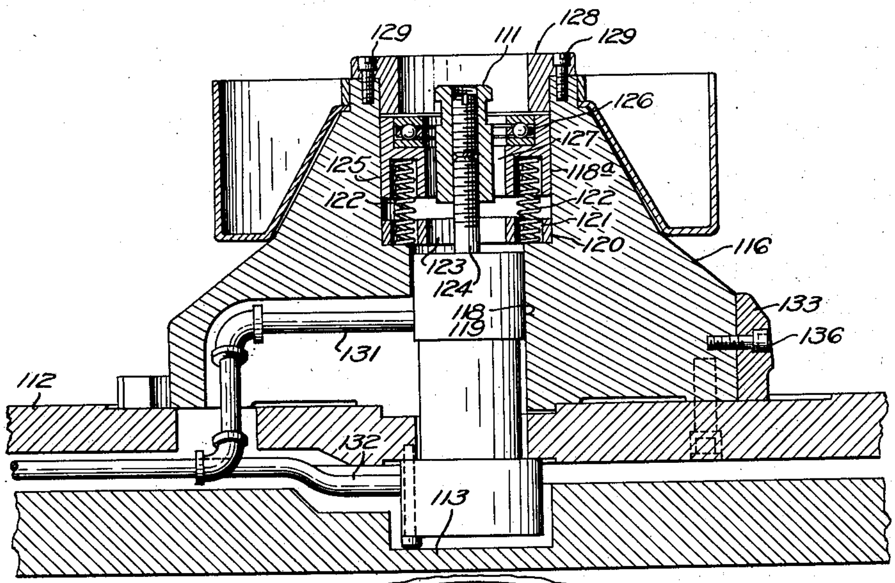
Fig. 21 is a longitudinal-sectional view of the cutter head centering fixture taken along the plane 21—21 of Fig. 7.
Figure 22:
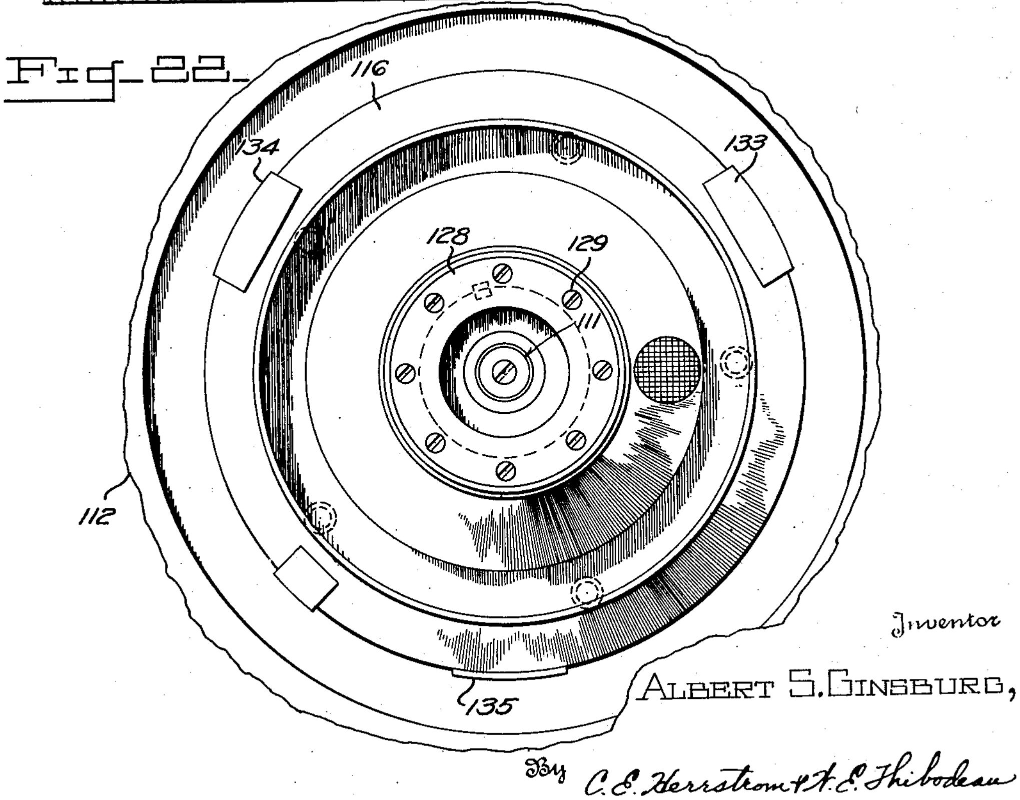
Fig. 22 is a top-elevational view of Fig. 21.

A shaft 503 is horizontally rotatably mounted in box 200 in two oppositely disposed bosses 504, the ends of such shaft being inserted in suitable holes provided in each of the bosses 504 as shown in Fig. 17. Bosses 504 are offset with respect to the vertical axis of spindle 26 so that a pinion 505 freely mounted on shaft 503 will intermesh with rack 203. Rock 203 is vertically supported by a boss 506 welded to the center of the bottom of box 200. One half of a unidirectional clutch 507 surrounds the integral hub of pinion 505 and is secured to such hub by screws 508. The other half of unidirectional clutch 507 is secured to a worm gear 509 by screws 510. Gear 509 is secured to shaft 503 by a pin 511. Interconnection between the halves of clutch 507 is effected by cooperating teeth 512. A spring 513 surrounds that portion of shaft 503 between pinion 505 and right hand boss 504, as shown in Fig. 17. Spring 513 is provided to bias the right hand half of clutch 507 into engagement with the other half of such clutch. The left end of shaft 503 is secured against displacement by a collar 514 secured to such end by a suitable pin.

A worm 515 (Fig. 18) is mounted on a shaft 516 disposed at right angles to shaft 503. Worm 515 is secured to shaft 516 by a pin 518. Shaft 516 is supported by two oppositely disposed bosses 517 welded to the sides of box 200. Worm 515 engages worm gear 509. A unidirectional clutch 519 is mounted on the left end of shaft 516 as shown in Fig. 18. The right half of such clutch is secured to shaft 516 by a key 520. A plurality of interengaging teeth 521 are provided about the edges of each half of clutch 519, as shown in Fig. 18, for the purpose of unidirectionally rotating worm 515 as will be presently described. A spring 522 surrounds shaft 516 between clutch 519 and worm 515 and biases the two halves of the clutch into engagement. A washer 523 placed about shaft 516 and adjacent worm 515 provides a suitable bearing for spring 522.

A pull-type solenoid 524 is mounted on the left side of box 200 as shown in Figs. 16 and 17. Solenoid 524 is secured to the side of box 200 by bolts 525. The armature 526 of solenoid 524 projects inwardly into the box 200 over the right half of unidirectional clutch 519. A lever 527 is screwed into a suitably threaded hole 528 in the right half of clutch 519 and locked thereto by a nut 529. The upper end of lever 527 is pivotally mounted to the inwardly projecting end of armature 526 by a transverse bolt 530.

A threaded rod 531 is mounted on the side of box 200 oppositely disposed to the armature 526 of solenoid 524. The threaded rod passes thru a boss 532, having a tapped hole to accommodate the threaded rod 531. A knurled knob 533 is secured to the outside end of rod 531 to provide convenient means for turning such rod. Projecting forwardly from the end of rod 531 is a stem portion 534 of reduced diameter which engages the inwardly projecting end of armature 526. Thus by turning knob 533, rod 531 can be advanced or retracted to increase or decrease the stroke of armature 526. A helical tension spring 535 surrounds rod 531. One end of such spring is connected to the inwardly projecting end of armature 526 while the other end is secured to boss 532. Spring 535 thus returns armature 526 to the position shown in Fig. 17 when the solenoid 524 is de-energized.

Figure 5:
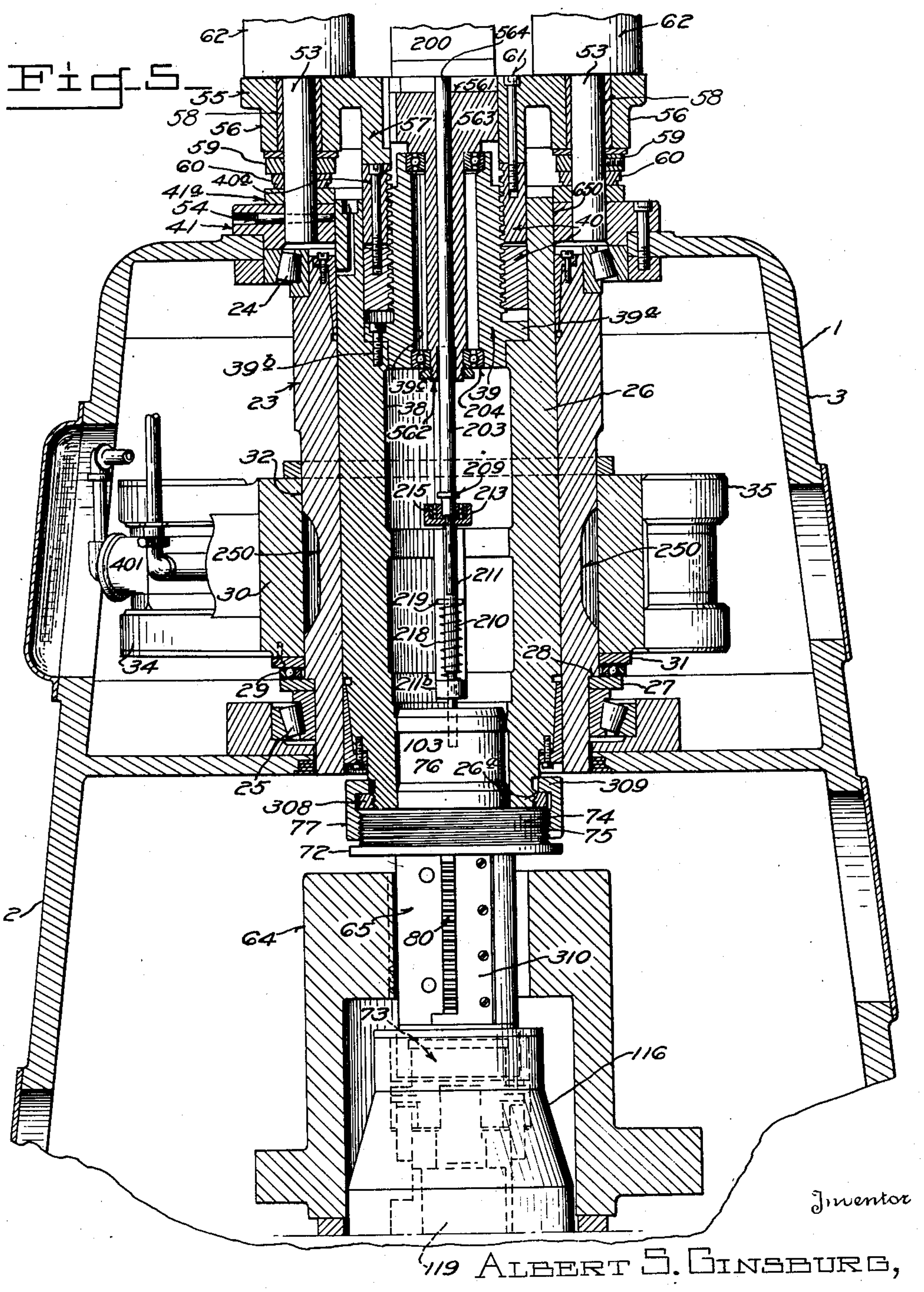
Fig. 5 is a cross-sectional view taken along the plane 5—5 of Fig. 2.
Figure 6:
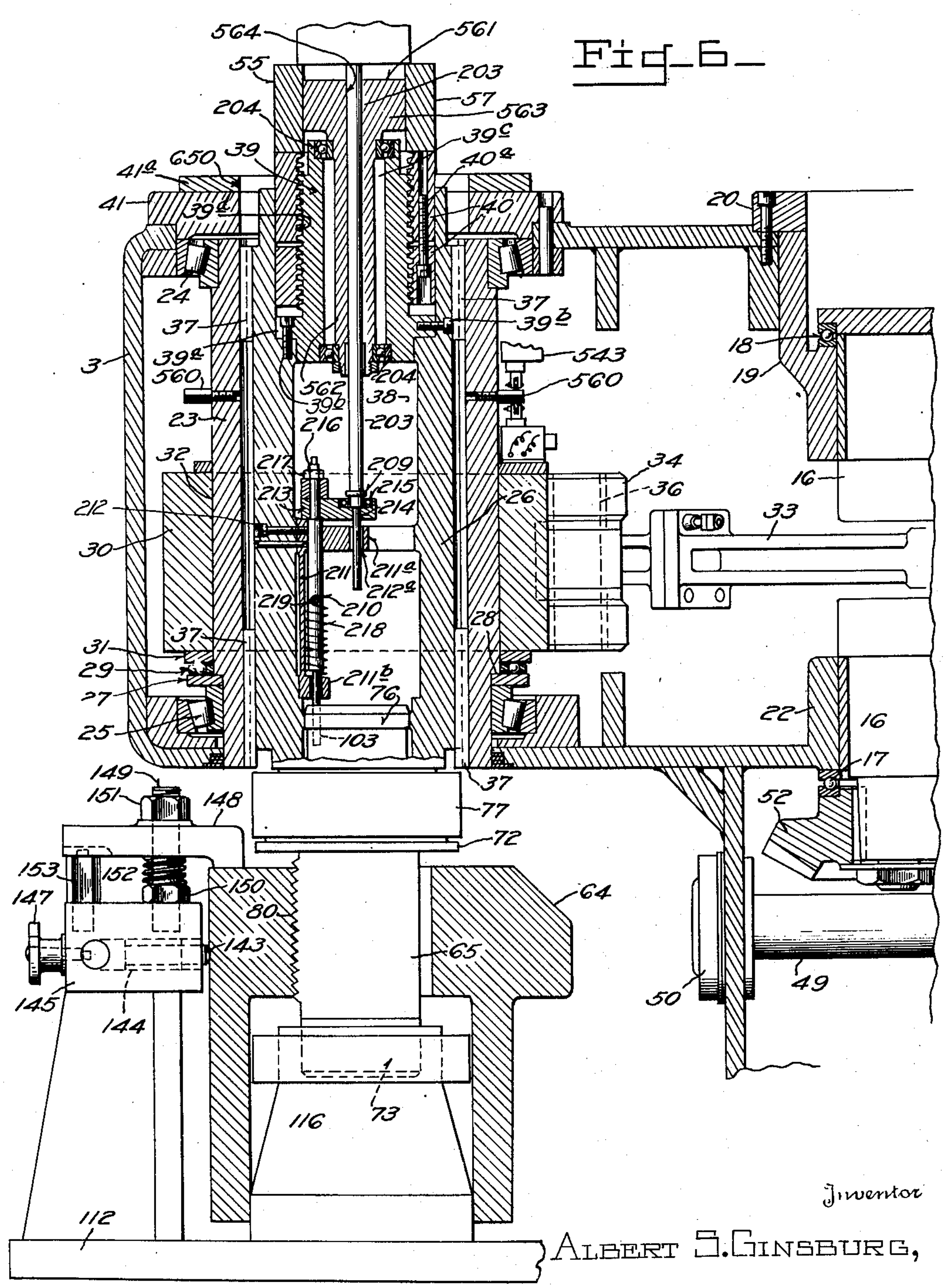
Fig. 6 is a partial, longitudinal-sectional view taken along the plane 6—6 of Fig. 3.

That portion of rack 203 which projects downwardly out of box 200 is vertically supported within a spindle 561 (Figs. 5 and 6). Spindle 561 comprises a reduced diameter stem portion 562 and a head portion 563. Such spindle is rotatably supported within the axial hole 39c of lead screw 39 by a pair of ball bearings 204 respectively provided at the top and the bottom of lead screw 39. An axial hole 564 is provided in spindle 561 in which rack 203 is supported in bearing relation. The lower end of rack 203 is supported by a bracket 211. The bracket 211 is secured to the side wall of spindle 26 by screws 212. Such bracket is provided with two integral outwardly projecting arms 211*a* and 211*b* at the top and bottom respectively as shown in Fig. 6. A vertical hole 212*a* is provided in the arm 211*a* thru which rack 203 is inserted so that such arm will vertically support the lower reduced diameter end of rack 203.

A plunger 210 which comprises a rod-like member is vertically mounted in the arms 211*a* and 211*b* of bracket 211. A spring 218 surrounds plunger 210 and rests against the upper surface of arm 211*b* of bracket 211. The upper end of spring 218 bears against a pin 219 which is fixedly secured in a transverse hole in plunger 210 to bias plunger 210 upwardly for a purpose to be later described. The lower end of plunger 210 enters hole 103 of pilot 76 of cutter head 65. The upper end of plunger 210 which projects above arm 211*a* of bracket 211 is of somewhat reduced diameter and an arm 213 is slipped over such reduced diameter portion. The arm 213 is secured to plunger 210 by a nut 217 which is screwed onto a threaded end portion 216 of plunger 210. The arm 213 is provided with a hole 214 thru which the rack 203 is passed. A ball bearing 215 is mounted within a suitable recess in the top of arm 213. A collar 209 placed about rack 203 snugly engages bearing 215. The function of rack 203 and plunger 210 will be described in more detail later.

When the thread cutting tool 80 is brought into cutting relationship with breech ring 64, such cutter is advanced outwardly a small amount with each reciprocation of cutter head 65. Such advancement of the cutter is effected by the mechanism housed within box 200. When solenoid 524 is energized, armature 526 is pulled to the left, as viewed in Fig. 17, which moves lever 527 to the left. Such movement rotates the unidirectional clutch 519 in a counterclockwise direction as shown in Fig. 17. The clutch 519 transmits this movement to worm 515 which in turn rotates worm gear 509. Worm gear 509 is then rotated in a clockwise direction as shown in Fig. 18. This direction of movement of worm gear 509 is transmitted by clutch 507 to pinion 505 which forces rack 203 upwardly against hydraulic piston 201*a*. The hydraulic pressure against piston 201*a* has previously been relieved to permit such upward movement, as will be described later. Simultaneously pressure against expansion member 68 in the cutter head by plunger 111 has likewise been relieved and remains relieved thruout the retracting stroke. Control of hydraulic fluid to both expansion member 68 and to piston 201*a* is controlled by solenoid operated hydraulic valves which are actuated by electrically controlled micro-switches at the proper time. This will be described in more detail later.

Thus when pressure has been released on piston 201*a*, spring 108 biases expansion member 68 downwardly permitting cutter 80 to collapse into its slot 79 in cutter head 65 which is effected by the bias of springs 90. As cutter 80 collapses, stud 87 strikes the projecting plunger 71*a* of micro-switch 71, thereby depressing such plunger and closing a suitable circuit to energize solenoid 524 thus advancing rack 203 as described above. Then thru micro-switch controls plunger 111 is forced upwardly at the beginning of the cutting stroke to contact expansion member 68, as will be presently described, hence forcing cutter 80 outwardly until the sloped surfaces 84 of cutter 80 engage the sloped surfaces 95*c* of wedge member 95 thereby arresting the outward movement of cutter 80.

When the circuit supplying solenoid 524 is opened by the outward movement of cutter 80 away from micro-switch 71, spring 535 pulls armature 526 of solenoid 524 inwardly into box 200 to the position shown in Fig. 16. When this occurs that portion of unidirectional clutch 519 keyed to shaft 516 is pushed to the right, as shown in Fig. 18, against the bias of spring 522 while the other half of such clutch is revolved to its original position, the teeth provided on such half of the clutch sliding over the teeth of the other half of the clutch keyed to shaft 516. Worm 515 locks worm gear 509 against rotational movement and hence maintains rack 203 in fixed position against the upward bias of spring 218.

Spindle 26 and hence cutter head 65 are raised for the insertion or removal of the breech ring 64, located on a sliding table 114, by the twin cylinders 62 provided on top of housing 1. The hydraulic cylinder 201 is simultaneously energized, as will be described, and forces rack 203 downwardly as cutter head 65 is raised. Pinion gear 505 then revolves freely on shaft 503 causing unidirectional clutch 507 to slip from its mating half. Once down, rack 203 cannot come back upwardly due to pressure from below, as worm 515 positively locks worm gear 509. The downward pressure on rack 203 is translated to plunger 210 thru the arm 213 and hence to plunger 104 thereby holding locking wedge 95 down and preventing thread cutter 80 from expanding.

Figures 14, 15, 20:
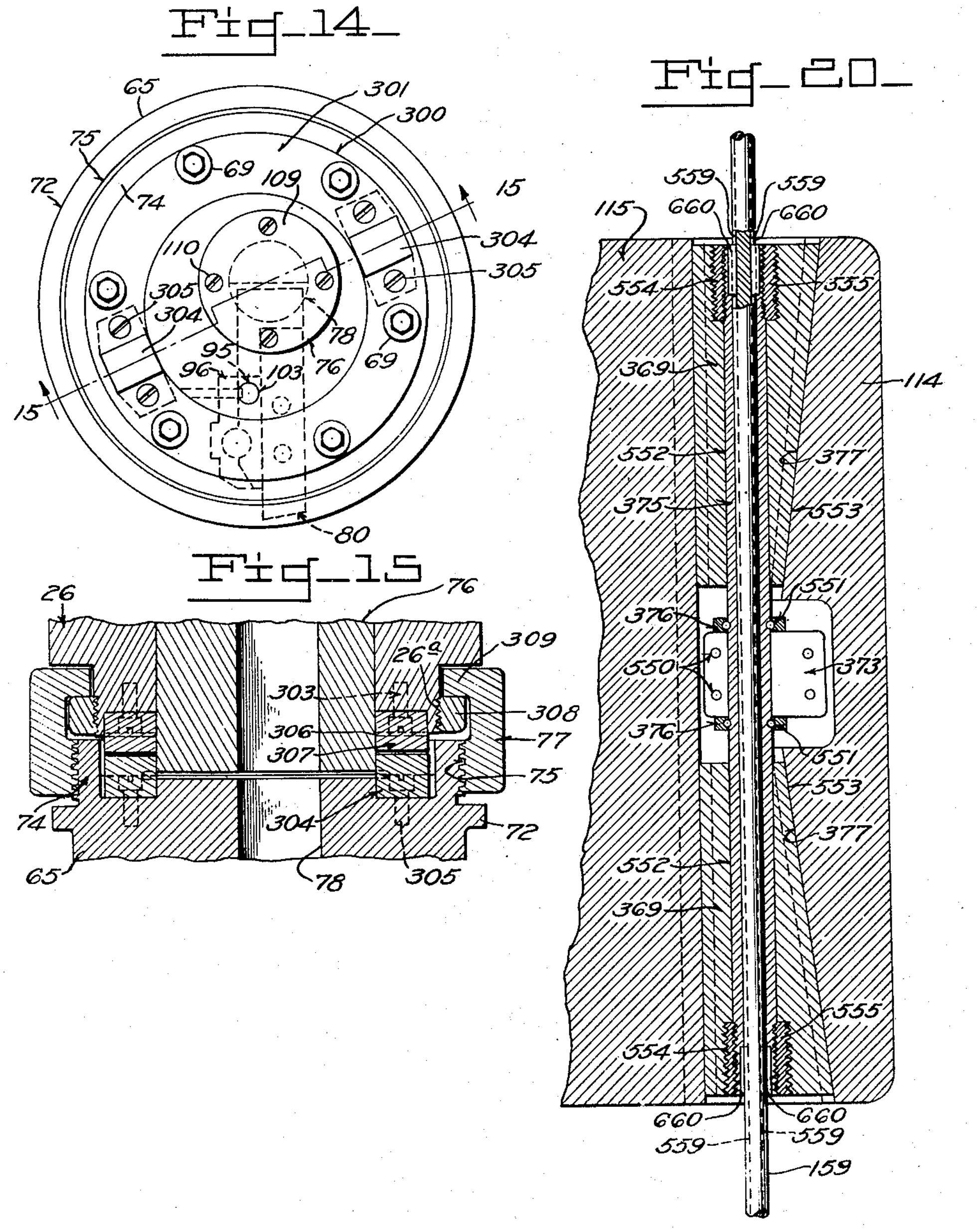
Fig. 14 is a top elevational view of Fig. 10 showing the keys utilized to secure the pilot to the cutter head.
Fig. 15 is a partial, longitudinal-sectional view taken along the plane 15—15 of Fig. 14.
Fig. 20 is a partial, longitudinal-sectional view taken along the plane 20—20 of Fig. 2 showing the arrangement of the wedges utilized to lock the sliding table against sideways movement.
Figure 24:
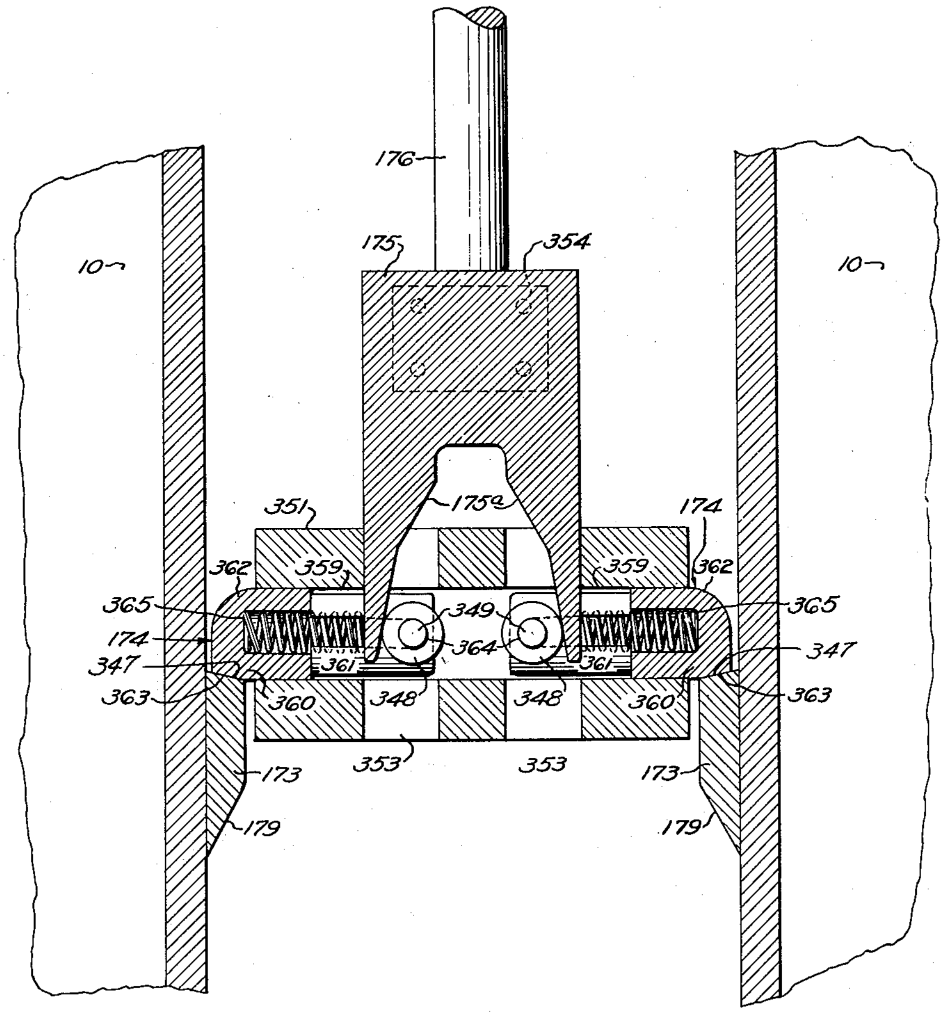
Fig. 24 is a partial, longitudinal-sectional view taken along the plane 24—24 of Fig. 4 showing the arrangement of the locks utilized for locking longitudinal movement of the sliding table and the forked cam utilized for actuating such locks.

Two parallel gibs 115 (Fig. 4) are integrally formed on top of the portion of table 10 underneath the overhanging head 3 of the breech ring threading machine. The gibs 115 are provided to slidably mount the table 114. The underside of table 114 is suitably recessed and shaped to engage the parallel gibs 115. The right side surface of the recessed bottom of table 114 is provided with two oppositely disposed longitudinally extending sloped surfaces 377 as shown in Fig. 20 for a purpose to be described. The table 114 supports the workpiece, for example, a breech ring 64, and such table is arranged to be moved along the gibs 115 by a hydraulic cylinder 154. The hydraulic cylinder 154 is mounted on a shelf 155 in the center of table 10 by two brackets 350 each of which is secured to shelf 155 by bolts 155*a*. Cylinder 154 is connected to the source of hydraulic fluid, the pump 410 by pipe lines 156 and 157 each respectively attached to opposite ends of the cylinder 154 to produce movement of the ram 176 in either direction. Connection is made between hydraulic cylinder 154 and table 114 by ram 176 and a bracket 351. Such ram projects out of the left end of hydraulic cylinder 154 as viewed in Figs. 1 and 2, and bracket 351 is secured to the underside of table 114 by bolts 352. Two horizontal rectangular slots 353 are provided in bracket 351, as shown in Fig. 24, to receive a forked cam 175 which is secured to ram 176.

A downwardly projecing bracket 354 is secured in depending relation to cam 175 by suitable bolts. Ram 176 is secured by threads to bracket member 354. An integral rod-like member which is provided on the front face of bracket 354 projects thru bracket 351 and is secured thereto by two nuts 358 as shown in Fig. 2. Cam 175 comprises a fork shaped member and the interior surfaces 175*a* thereof engage rollers 348 in cam relationship and thereby actuate a pair of locks 174. The two locks 174 are mounted in spaced, opposed relationship in a transverse hole 359 in bracket 351. Such locks are substantially cylindrical and are provided on one end with an enlarged head portion 360. An axial recess 361 is provided in each lock 174 which extends nearly to the end of the head portion 360. A rounded corner 362 is provided on one edge of head portion 360 to enable lock 362 to ride over the edge of a stop 173 as will be presently described. Opposite the rounded corner 362, a sloped locking surface 363 is provided which corresponds with and engages a similar sloped surface on each of a pair of stops 173 which will be later described. The stem portion of each lock 174 is bifurcated. A transverse hole 364 is provided near the interior edge of the bifurcated end of lock 174 in which is inserted a pin 349. The roller 348 is mounted on pin 349 within the bifurcated stem of each lock 174 as shown in Fig. 24.

Each lock 174 lies within hole 359 so that the head portion 360 thereof projects outwardly from opposite ends of hole 359. Each prong of the forked end of cam 175 is inserted within respective slots 353 of bracket 351 so that the interior surfaces 175*a* thereof engage the rollers 348 as shown in Fig. 24. The cam surfaces 175*a* are sloped inwardly as shown in such figure to withdraw locks 174 out of engagement with stops 173. The inside surface of each prong of cam 175 thus bears against roller 348. A spring 365 placed within axial recess 361 in each lock 174 bears against the outside edge of the prong of cam 175 thereby biasing the locks 174 outwardly.

Stops 173 are secured to table 10 in spaced opposed relationship by bolts 366 in the position shown in Fig. 2. Stops 173 essentially comprise short sections of angle iron and each is provided with a sloped surface 179 on the entering edge thereof as shown in Fig. 24 to cam locks 174 inwardly when the rounded edge 362 of such locks strikes this sloped surface. A sloped locking surface 347 is provided on the inside edge of the stops 173 and corresponds to the sloped locking surface 363 of each lock 174. By arrangement of the locks 174 and cam 175, sliding table 114 may be locked in working position to support a workpiece in alignment with the spindle in a manner to be fully described later.

Table 114 is locked against sideways movement on gibs 115 by two wedges 369. The wedges 369 are mounted on a splined shaft 159 as will be presently described and such shaft is mounted adjacent right hand gib 115 as shown in Fig. 3. Shaft 159 is rotatably supported on the left end of table 10, as viewed in Fig. 2, by a bracket 370 and is secured to such bracket by a collar 371. The other end of splined shaft 159 is mounted in a suitable bearing 372. Rotation of splined shaft 159 is effected by a hand wheel 161 mounted on the outside of housing 1 as shown in Figs. 2 and 4. Connection is made between hand wheel 161 and splined shaft 159 by a vertical shaft 166 and suitable gearing between such hand wheel and splined shaft 159.

A long sleeve 375, provided with threaded ends, one right hand threaded and the other left hand, surrounds splined shaft 159 and is in turn surrounded at its mid section by a bracket 373 which is secured to the underside of table 114 by a plurality of screws 550. Sleeve 375 is rotatably secured to bracket 373 by two collars 376, one each of such collars being placed against opposite sides of bracket 373. Each collar 376 is fastened to sleeve 375 by two oppositely disposed transverse pins 551 as shown in Fig. 20. Two oppositely disposed key slots 559 are provided in the interior wall of sleeve 375. A key 660 is inserted in each slot 559 which also engages the splined portion of shaft 159 to secure sleeve 375 to shaft 159 for rotational movement.

A pair of wedges 369 are provided, each having a longitudinal hole 552 therethrough to slidably mount such wedges on sleeve 375. Each of such wedges is provided with an inclined sloped surface 553 which cooperates with inclined surfaces 377 on table 114, while the side of each wedge opposite surface 553 cooperates with the right hand gib 115 as will be presently explained. Wedges 369 are mounted on sleeve 375 with the small ends thereof facing bracket 373 as shown in Fig. 20. The hole 552 in wedges 369 is counterbored and threaded as shown at 554 on the outwardly facing ends thereof. A bushing 555 is screwed into the counterbored ends 554 of each wedge 369. Such bushing is provided with a threaded interior which engages the corresponding threads on each end of sleeve 375 thereby securing each wedge to such sleeve.

A plurality of notches may be provided on the outwardly facing ends of each bushing 555, any one of which may be engaged by a key 557 to lock such bushing in any one of a plurality of rotative positions, to thereby provide limited longitudinal adjustment of wedges 369 with respect to surfaces 377 to take up for wear and for positioning such wedges in proper location. Each key 557 is secured to the outwardly facing end of each wedge 369 by a screw 558 as shown in Fig. 4.

Table 114 is readily locked against sideways movement on gibs 115 of table 10 in any position desired by simply rotating hand wheel 161. Rotation of such hand wheel revolves splined shaft 159 through the gearing connection as previously mentioned and hence sleeve 375 is rotated. As the threaded ends of sleeve 375 lie within correspondingly threaded bushings 555, rotation of such sleeve in one direction moves wedges 369 together along the sloped surfaces 377 and along right hand gib 115 while reverse rotation separates the wedges. Such movement is possible because the ends of sleeve 375 are oppositely threaded, that is, one end is provided with a left hand thread while the other has a right hand thread. Thus the wedging action produced by moving wedges 369 against right hand gib 115 as shown in Figs. 3 and 20 and along the sloped surfaces 377 of table 114 locks table 114 against sideways movement by forcing such table tightly against the left hand gib 115. Wedges 369 are readily unlocked by rotating hand wheel 161 in the opposite direction. Such movement forces wedges 369 to move in the opposite direction thereby releasing the wedging action produced by such wedges.

Sliding table 114 is limited in its rearward travel by two stops 583 and 584. Such stops comprise suitable bolt-like members and are oppositely disposed as shown in Fig. 3. The stops 583 and 584 are respectively screwed into threaded horizontal holes 585 and 586. A check nut 587 is placed on each stop 583 and 584 to lock stops 583 and 584 in any desired position. Two bolts 588 and 589 are horizontally secured to table 114 opposite stops 583 and 584 to provide a substantial bearing surface. Thus by means of stops 583 and 584, adjustment can be readily made to permit table 114 to stop in proper location under the cutting head of the machine and with respect to locking surfaces 363.

Figures 7, 8, 9:
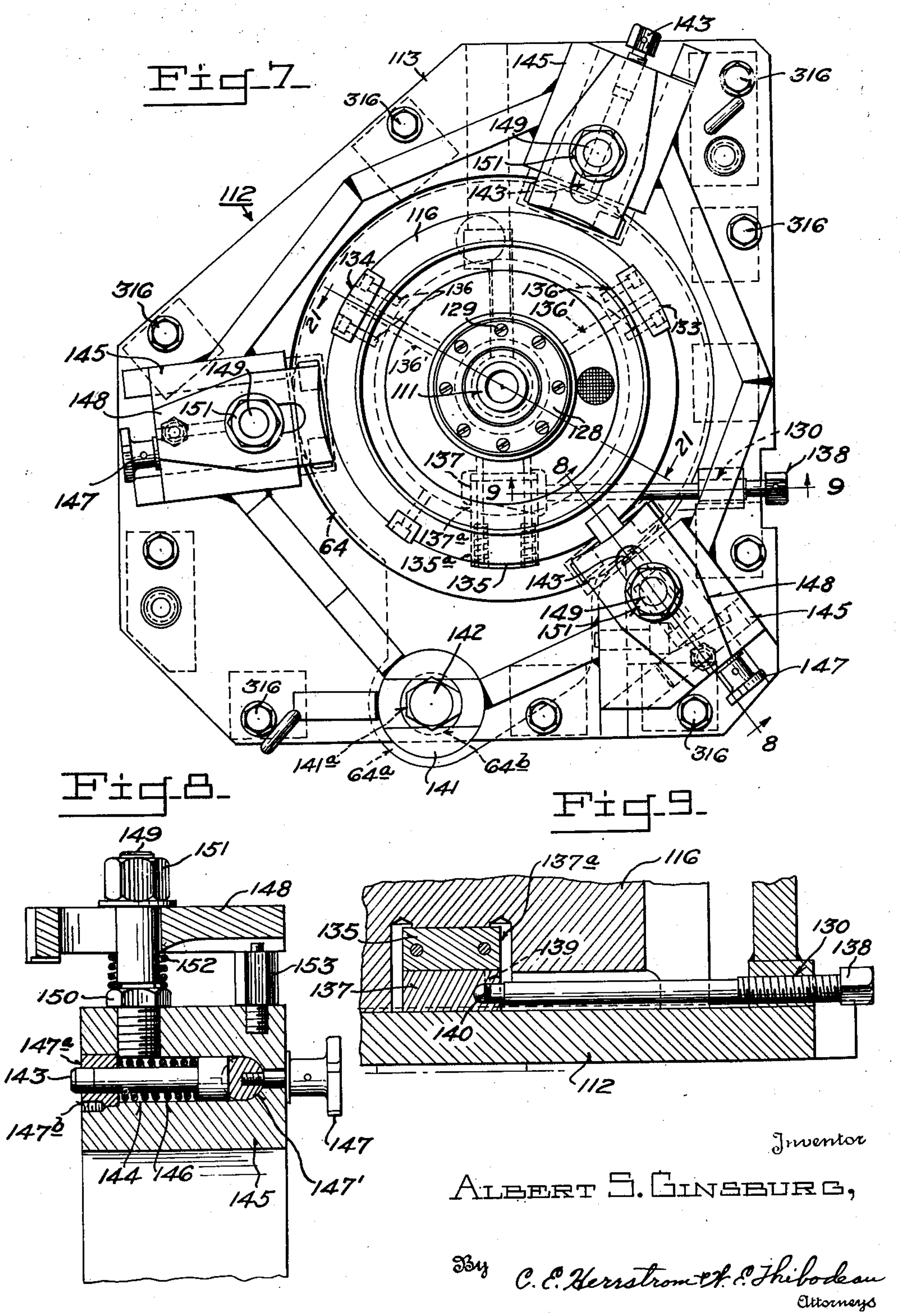
Fig. 7 is a top-elevational view of the breech ring fixture showing the breech ring mounted therein.
Fig. 8 is a partial, longitudinal-sectional view taken along the plane 8—8 of Fig. 7 showing the breech ring clamping device and positioning plunger.
Fig. 9 is a partial, cross-sectional view taken along the plane 9—9 of Fig. 7 showing the details of the adjustable bed for positioning the breech ring within the breech ring fixture.

The breech ring 64 is supported on table 10 in a breech ring fixture 112. The breech ring fixture 112 is preferably of welded steel plate construction as shown in Figs. 6 and 7. Such fixture comprises a base 113 and vertical sides substantially hexagonal in shape. Fixture 112 is secured to sliding table 114 by bolts 316 passing thru such table and base 113.

In the center of base 113 there is mounted a centering member 116 for the cutter head 65. The centering member 116 comprises a truncated cone shaped cast member and is suitably bolted to base 113. An axial hole 118 is provided in the centering member 116 to receive a hydraulic cylinder 119. The upper end 118a of hole 118 is counterbored and in the bottom of such counterbored portion a ring 120 is inserted which snugly engages the walls thereof. A plurality of equally spaced holes 121 are provided in ring 120 to receive the ends of springs 122. Ring 120 has an axial hole 123 to permit passage therethrough of a piston rod 124 of hydraulic cylinder 119. A plunger 111 is screwed to the top end of piston rod 124.

Another ring 125 similar to ring 120 is supported by springs 122. Ring 125 however is of substantially greater depth and is provided with a circular recess in the upper end thereof to receive a ball-bearing 126. An axial hole 127 is provided in ring 125 to permit passage of plunger 111. A bushing 128 is inserted in the top of the counterbored portion of hole 118 and is secured to the centering member 116 by screws 129. Bushing 128 is provided to receive the pilot 73 of cutter head 65. Thus bushing 128 provides a thrust bearing support for the end of cutter head 65 and the ball bearing 126 reduces the friction of the load on the end of cutter head 65. Hydraulic cylinder 119 is connected to the hydraulic fluid pump 410 by the oil lines 131 and 132.

To accurately center the breech ring 64 within the fixture 112, there are provided about the periphery of the bottom of centering member 116 three equally spaced bearing pads 133, 134 and 135. It is obvious that the interior of the breech rings should be located on the centering member 116 within relatively close tolerances in order to insure and maintain accurate cutting of threads on the stepped interior of the breech ring. The pads 133 and 134 are provided with an exterior arcuate surface conforming to the corresponding arcuate surface of the interior of the breech ring. Each pad 133 and 134 is secured in place by two screws 136 and a pin 136′ as shown in Fig. 7.

The pad 135 is adjustable and is roughly rectangular in shape. The inwardly disposed end of pad 135 is sloped while the outwardly facing end has an arcuate surface corresponding to that of the arcuate surface of pads 133 and 134. Pad 135 lies in a suitable slot 135a in the base of centering member 116. A wedge 137 is placed in a slot 137a in back of pad 135 in centering member 116 and is actuated by a screw 138. The screw 138 passes through a suitably threaded hole 130 in the side wall of fixture 112 and communicates with the slot 137a in which the wedge 137 is inserted. The end of screw 138 is secured to wedge 137 by a pin 139 which engages an annular groove 140 about the end of screw 138. Thus as screw 138 is turned in either direction, wedge 137 will be advanced or retracted. It may then be readily seen that when breech ring 64 is placed over the pads 133, 134 and 135 that by turning screw 138 inwardly, wedge 137 is moved outwardly thereby forcing pad 135 to bear tightly against the interior of breech ring 64 hence forcing such breech ring to bear snugly against each of the other pads 133 and 134.

When the workpiece is a breech ring, advantage is taken of an integral lug 64a commonly provided on the lower edge of breech ring 64, as shown in Fig. 7, to further assist in aligning the breech ring in the fixture 112. A hole 64b is provided in lug 64a, the center of which is held to within a very small tolerance of a prescribed distance to the center of centering member 116. A boss 141 is therefore provided in the side wall of fixture 112 and has an accurately ground hole 141a in which is inserted a pin 142 which snugly engages the walls of hole 64b to assist in positioning breech ring 64 within fixture 112. Breech ring 64 is additionally supported at its upper end by three horizontal plungers 143 spaced equidistantly about the periphery of breech ring 64. The plungers 143 are supported in three lugs 145 which are horizontally welded to the top of fixture 112. Plungers 143 are mounted in suitable holes 144 in lugs 145 and are biased outwardly by springs 146 which surround each of the plungers 143. Each plunger 143 is retained within each hole 144 by a bushing 147*a*. Bushing 147*a* is in turn secured within the end of hole 144 by a screw 147*b* as shown in Fig. 8. An adjusting screw 147 is provided in each lug 145. Such screw is threadably secured to a ball 147′ which contacts the base of each plunger 143 thereby affording ready adjustment inwardly or outwardly of plungers 143.

On the top of each lug 145, a clamp 148 is provided to hold the breech ring 64 firmly against the base 113 of fixture 112. Clamp 148 is mounted on a stud 149 which is screwed to top of lug 145. Stud 149 is locked to lug 145 by a lock nut 150. A nut 151 is screwed onto the upper threaded end of stud 149 to tighten clamp 148. A spring 152 surrounds stud 149 to bias clamp 148 upwardly to raise the clamp out of the way when removing the breech ring from the fixture. Another stud 153 is secured preferably by threads to the top of lug 145 to support the free end of clamp 148. The other end of clamp 148 overhangs sufficiently to bear against the top of breech ring 64.

To cut threads on the stepped interior surface of the breech ring 64 of a large caliber gun, table 114 is first moved its fullest extent to the left as viewed in dotted outline in Fig. 2 by hydraulic cylinder 154. The breech ring 64 is then lowered into breech ring fixture 112 so that lug 64*a* is placed over locating pin 142. Pads 133, 134 and 135 engage the interior surface of breech ring 64. Wedge 137 is then forced against adjustable pad 135 by the screw 138 thereby causing breech ring 64 to bear tightly against each of the pads 133, 134 and 135. Thus the lower edge of breech ring 64 is held firmly and securely in fixture 112. Plungers 143 are set by adjusting screw 147 to position the upper edge of breech ring 64. Clamps 148 are then placed on the upper edge of breech ring 64 and are brought to bear tightly against the upper edge of breech ring 64 by tightening nuts 151 on studs 149. Table 114 is then moved to the right as shown in Fig. 1 by the hydraulic cylinder 154 whereupon it will strike the stops 583 and 584 and is locked in such position by locks 174 of the previously described locking mechanism.

When cutting threads on the stepped interior of breech ring 64, it is obvious to those skilled in the art that forming the thread with one pass of the cutter on each step is a practical impossibility. Consequently, it will be necessary for the cutter head to reciprocate a number of times and to advance the thread cutting tool 80 into the work a small amount for each reciprocation of the cutter head 65. In this manner the thread will be formed gradually and well within the capabilities of the machine to produce such threads smoothly and accurately. The amount the cutter 80 is advanced into the workpiece is determined by the upward movement of rack 203. The upward movement of rack 203 produced by solenoid 524 can be controlled to the extent that cutter 80 will advance radially as little as one-thousandth of an inch at a time. It is readily apparent that the movement of solenoid 524 determines the movement of such rack as the travel of such solenod governs the rotation of clutch 519 and finally the rotation of pinion 505 which determines the amount the rack 203 can move upwardly.

As each step of the stepped interior surface of the workpiece is threaded, the position of the cutting tool has to be changed in order to cut the thread on the adjacent step. The angular relationship of the cutting blade to the workpiece is changed at the completion of threading each step by indexing the cutter head. Such indexing is effected by removing pin 400 out of engagement with one of the slots 250 in spindle body 23 and permitting such pin to engage the adjacent 30 degree spaced slot 250 at the proper time. Such indexing is effected by solenoid-operated, hydraulic cylinders all of which are electrically controlled as will be presently described.

A shaft 536 (Fig. 3) is vertically mounted on the axis of crank shaft 16 and suitably secured thereto and projects thru the top of housing 1. Two arms 537 and 538 are keyed to shaft 536 in such fashion that each of such arms is oppositely disposed and the arm 537 is located above arm 538. Two micro-switches 539 and 540 are mounted on top of housing 1 on suitable brackets and are spaced 180 degrees apart. Micro-switches 539 and 540 are at such height that switch 539 will be engaged by arm 537 and the arm 538 will contact micro-switch 540 as crank shaft 16 rotates.

On the top of head 3, as shown in Fig. 4, a shaft 576 is vertically mounted adjacent the left side of twin cylinders 62. The bottom end of such shaft is suitably secured to such head. The upper end of shaft 576 is threaded and an arm 577 is horizontally mounted thereon. Such arm is secured to such shaft by two nuts 578 and 579 placed adjacent opposite sides of arm 577. A micro-switch 545 is bolted or otherwise secured to the horizontal arm 577 in such a position that micro-switch 545 will be engaged by a stop 581 when yoke 55 is raised to its uppermost position. Stop 581 preferably comprises a short section of angle iron and is secured to yoke 55 as by a bolt 582.

*Operation*

Figure 28:
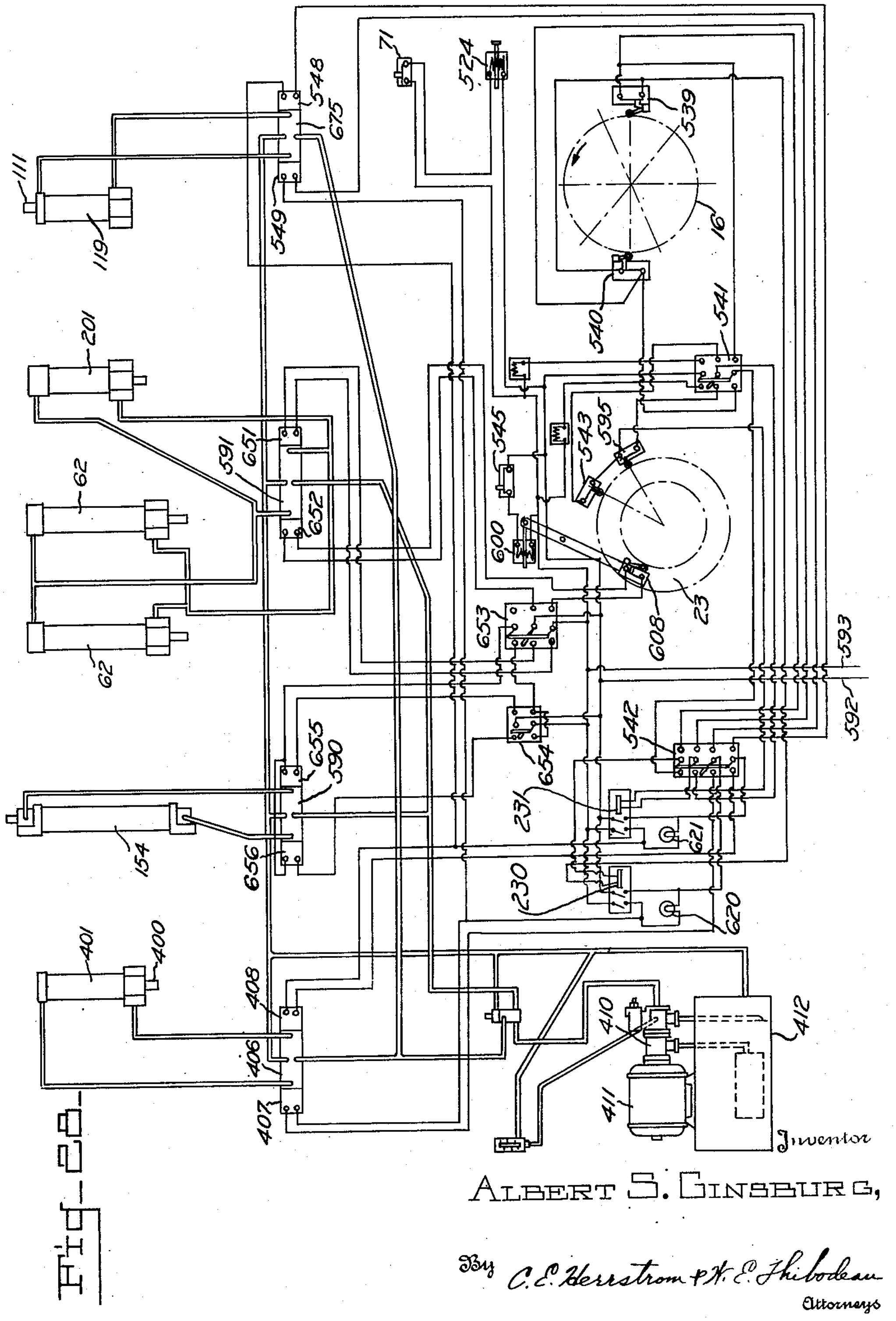
Fig. 28 is a view showing diagrammatically the hydraulic and electrical system utilized for the operation of the breech ring threading machine.

Referring to Fig. 28 there is shown a schematic diagram of the hydraulic system and wiring system utilized for operation of the breech ring threading machine previously described. The electrical current is supplied to the circuit shown in such figure by power lines 592 and 593. As is readily apparent from Fig. 28, the various solenoid operated hydraulic valves are supplied hydraulic fluid by motor 411 and pump 410 by suitable pipe lines shown schematically on such figure.

To mount the breech ring 64 on sliding table 114, such table is moved to the left by hydraulic cylinder 154. Cylinder 154 is actuated by a valve 590. Valve 590 is a two-way valve and such valve is open and shut by solenoids 655 and 656 mounted respectively at the opposite ends of such valve. Solenoid 655 is energized by throwing the two-pole, double throw table moving switch 654 to the right as shown in Fig. 28 provided that the spindle raising switch 653 is thrown to the left or spindle raised position. Upon energization of solenoid 655 valve 590 is opened whereupon hydraulic fluid is admitted to one end of cylinder 154 forcing ram 176 and hence table 114 outwardly. The breech ring 64 is then mounted in the breech ring fixture as previously described. Table 114 is then moved inwardly to bring such breech ring into position under the cutter head 65 by throwing double throw switch 654 in the opposite direction provided that spindle raising switch 653 is still in its left hand position. This energizes solenoid 656 which opens two-way valve 590 to admit hydraulic fluid to the other end of cylinder 154 to retract ram 176. When table 114 strikes stops 583 and 584 the breech ring 64 is then properly positioned under cutter head 65 and switch 654 is then raised to the open position. Table 114 is automatically locked against longitudinal movement by the locks 174 as previously described. Sideways movement of table 114 is locked by wedges 369 which are actuated by a hand wheel 161 likewise previously explained.

Prior to moving the breech ring 64 on sliding table 114 into position under cutter head 65, spindle 26 has to be in the raised position. Such spindle is raised by the twin hydraulic cylinders 62. Such cylinders are actuated by a solenoid operated valve 591 which is a two-way valve operated by two solenoids 651 and 652 each attached to opposite ends of such valve. Solenoids 651 and 652 are connected to a three-pole, double throw switch spindle raising 653. When such switch is thrown to the left as shown in Fig. 28, the said solenoid 651 is energized thereby opening valve 591 and admitting hydraulic fluid to one end of each hydraulic cylinder 62 to raise spindle 26. As such cylinder is raised, the blade retracting hydraulic cylinder 201 mounted in the center of yoke 55 is also loaded. Piston 201*a* is then forced downwardly which in turn forces rack 203 downwardly. Movement of rack 203 causes pinion 505 to rotate freely on shaft 503 and unidirectional clutch 507 to slip. When rack 203 is fully depressed, such rack cannot be biased upwardly by spring 218 because worm 515 cannot be turned by worm gear 509 inasmuch as a positive lock is formed insofar as turning of worm 515 by worm gear 509 is concerned. Downward pressure on rack 203 is in turn transmitted to plunger 210 by the arm 213, the lower end of plunger 210 thus holding wedge 95 down, thereby preventing cutter 80 from expanding outwardly. Thus upward pressure applied to expanding member 68 has no effect and the cutter is held retracted.

The angular position of cutter 80 has to be predetermined with respect to the breech block workpiece before cutter head 65 is lowered into breech ring 64. When spindle 26 is raised to the top position, the micro-switch 545 is closed which energizes the pull type solenoid 600. Energizing such solenoid pivots micro-switch 608 into contact with spindle 26. Micro-switch 608 is normally closed which keeps the circuit closed for lowering solenoid 652. Pivoting micro-switch 608 against spindle 26 opens such normally closed switch thereby opening the circuit for lowering spindle 26. As cutter head 65 is angularly indexed relative to the driving sleeve, in a manner to be presently described, cam notch 614 in spindle body 23 comes into position and permits roller 610 of micro-switch 608 to spring into such cam notch thereby closing the switch, completing the circuit for lowering solenoid 652 and hence permitting the head to be lowered by throwing switch 653 to the right. When switch 653 is thrown to the right, solenoid operated valve 591 is opened by solenoid 652. Hydraulic fluid is then admitted to the other end of hydraulic cylinder 62 thereby forcing spindle 26 downwardly and pressure is relieved in cylinder 201. When the spindle is lowered switch 653 may be returned to a neutral position.

When step threading a breech ring having four major diameters and four minor diameter steps, there are provided in cutter head 65 four cam notches 614 for cutting the major diameter steps. Such cam notches are so positioned that only when the cutter blade 80 is in a proper angular position to come down in a major step diameter is there a cam notch available to contact micro-switch 608. Similar cam notches are provided about another similar cutter head 65 for the minor diameter steps for use with the minor diameter cutter. Upon closing of the circuit, above mentioned, spindle 26 starts on its downward travel, solenoid 600 is deenergized by micro-switch 545 and micro-switch 608 is swung out of the way clear of the descending cutter head 65.

After lowering the spindle to bring the cutter into position adjacent a step on the inside surface of breech ring 64, the crankshaft 16 is set in motion by energization of the power source (not shown), thus rocking the spindle. The workpiece is of course angularly positioned on the table so that the reciprocation of the cutting tool overswings slightly at each end the length of the adjacent step surface. Each step surface of the breech ring has a clearance slot at one end thereof, permitting the cutting tool to overswing the work surface slightly at each end of the rocking movement.

As previously pointed out, cutter head 65 has to reciprocate a number of times in order to thread each step of breech ring 64. On the back stroke of each reciprocation, or the non-cutting stroke, the cutting tool 80 is retracted. This is effected when arm 537 strikes micro-switch 539. Primary control switch 542 is however, first thrown to the right hand "cut" position as viewed in Fig. 4. Indexing direction switch 541 is placed in a neutral position. When arm 537 strikes switch 539 at the end of the cutting stroke, solenoid 549 is energized to retract the plunger of hydraulic cylinder 119, thereby collapsing expansion member 68. As cutter 80 retracts under the bias of springs 90, stud 87 secured to such cutter depresses micro-switch 71 thereby closing a circuit energizing solenoid 524. When such solenoid is energized, armature arm 526 is forced forwardly rotating clutch 507. This movement rotates worm 515 and hence worm gear 509. Worm gear 509 in turn rotates pinion gear 505 permitting rack 203 to move upwardly a small amount. This upward movement is produced by the compression of spring 218. When plunger 210 is moved upwardly, the locking wedge 95 is likewise moved upwardly and cutter 80 is expanded by expansion member 68 as pressure is applied thereto by hydraulic cylinder 119. As the cutter moves outwardly, microswitch 71 is opened thereby opening the circuit and de-energizing solenoid 524. It should be noted that cutter 80 retracts farther inward under force of springs 90 than the extreme inward position assumed by the wedge 95. Spring 535 then returns armature 526 to the relaxed outward position thereby completing the expansion cycle. When the armature 526 is returned to the relaxed position by spring 535, unidirectional clutch 507 slips and in this fashion no motion is given to worm 515. It is desired to point out here that the collapse of cutter 80 can be effected only when pressure is released from expansion member 68. Spring 108 forces such expanding member downwardly and springs 90 retract cutter 80.

When arm 538 strikes micro-switch 540 at the end of the return stroke, a solenoid 548 of a two-way hydraulic valve 675 is energized thereby raising plunger 111 of hydraulic cylinder 119. Thus cutter 80 is expanded radially into cutting relationship with the step being threaded and its radial position is slightly greater than that of the previous stroke. Such expansion is timed to occur just shortly before the cutter is about to start the cutting stroke. Thus cutter 80 is incrementally advanced into the work by the cutter expansion device on each cutting stroke and retracted out of cutting position on each backstroke or non-cutting stroke of cutter head 65.

Upon completion of the cutting of threads on one step, spindle 26 is raised by throwing switch 653 to the left as mentioned above and such spindle is then indexed to change the angular location of cutter 80 in order to bring such cutter into cutting relationship with the next step on the interior of breech ring 64 to be threaded. Indexing is accomplished in the following manner: The three-pole, double-throw indexing direction switch 541 and the four-pole double throw primary control switch 542 are provided for energizing suitable circuits for indexing cutter head 65. Switch 542 is thrown to the left for indexing as shown in Fig. 28. To index cutter head 65 to the right, switch 541 is thrown to the right as shown in Fig. 28. Corresponding indicating lights 230 and 231 are energized by the right and left hand positions of switch 541.

As has already been mentioned horizontal arm 537 on top of crankshaft 16 strikes micro-switch 539 as crankshaft 16 rotates, thus closing a circuit to energize solenoid 408 of valve 406. Hydraulic fluid is admitted to one end of hydraulic cylinder 401 thereby pulling pin 400 out of slot 250 in spindle body 23. A light 621 indicating that such pin is out of engagement with slot 250 is illuminated. Spindle body 23 then remains stationary and driving arm 30 continues to rotate until micro-switch 543 is engaged by one of the pins 560 on spindle body 23. Switch 543 is then closed which closes a circuit energizing solenoid 407 which actuates cylinder 401 thereby inserting pin 400 into the next spaced slot 250 in spindle body 23. Light 621 goes out and another light 620 is illuminated indicating that pin 400 is in engagement with slot 250. Left hand indexing is obtained when switch 541 is thrown to the left position indicated in Fig. 28. Such procedure reverses the indexing and the micro-switch 595 is contacted by the lower corner of the next radially spaced pin 560 thereby actuating solenoid operated valve 406 to remove pin 400 at the forward part of the stroke and replace such pin at the back part of the stroke.

Upon completion of cutting of one step of the stepped interior of the breech ring 64, primary control switch 542 is thrown to its neutral position and the cutter head 65 is raised by closing the triple pole, double throw switch 653 to the left position as indicated in Fig. 28. By throwing switch 542 and 653 in this fashion micro-switches 539 and 540 are cut out thereby causing collapse of the cutter 80 and energizing solenoid 651 to actuate hydraulic cylinders 62 to raise spindle 26 and hence cutter head 65 out of breech ring 64. Cutter head 65 is then indexed to the next position as previously described.

When the four major diameters of the steps in breech ring 64 are threaded, cutter head 65 is replaced with another of smaller diameter to cut the four minor diameter steps. The manner of cutting such minor diameter steps is identical to threading of the major diameter steps. When breech ring 64 has been completely threaded and the spindle raised, table 114 is moved to the left, as shown in Fig. 2, by throwing double pole switch 654 to the left hand position indicated in Fig. 28 which energizes a solenoid 656 to force the piston of hydraulic cylinder 154 outwardly to move such table. Thus breech ring 64 is moved out from under cutter head 65 whereupon it can be readily replaced with another breech ring to be threaded.

As previously mentioned the pitch of the thread to be cut on the stepped interior of breech ring 64 can be readily changed. This is effected by removing lead screw 39 and the split lead screw nut 40 and replacing such lead screw and nut with a corresponding lead screw and nut having a pitch that is desired to be produced within breech ring 64.

In the specific example illustrating this invention, connecting rod 33 was shown connected to apex 34 thus imparting a rocking motion to the spindle of length suitable for an eight step breech block. By connecting rod 33 to apex 35, the length of rocking motion is reduced to correspond to a twelve step breech block. Thus workpieces having substantially different interior contours may be handled on the same machine.

I claim:

1. A machine tool comprising a spindle, reciprocating means connected to said spindle for rocking said spindle thru a limited arc, a cutting tool mounted on said spindle, clamping means for rigidly supporting a workpiece in cooperative relationship to said cutting tool, hydraulic actuated wedging means for advancing said cutting tool radially outwardly with respect to said spindle, and solenoid means for operating said last mentioned means at the beginning of each cycle of rocking movement of the spindle.

2. A thread cutting machine tool comprising a rotatable spindle, reciprocating means connected to said spindle for rocking said spindle thru a limited arc, a lead nut engageable with a threaded section of said spindle to impart a helical lead to the rotary movement thereof, a cutting tool mounted on said spindle, clamping means for rigidly supporting a workpiece in cooperative relationship to said cutting tool, hydraulic actuated wedging means for advancing said cutting tool radially outwardly with respect to said spindle, and solenoid controlled means for operating said last mentioned means at the beginning of each cycle of rocking movement of the spindle.

3. A machine tool comprising a spindle, a cutting tool mounted on said spindle, clamping means for rigidly supporting a workpiece in cooperative relationship to said cutting tool, reciprocating means connected to said spindle for rocking said spindle thru a limited arc, said rocking motion comprising respectively a cutting stroke and a return stroke, hydraulic actuated wedging means for supporting said cutting tool in a radially outwardly displaced position relative to said spindle during said cutting stroke, and resilient means for retracting said cutting tool radially inwardly relative to said spindle during said return stroke.

4. A machine tool comprising a head portion, a spindle mounted in said head portion for rotatable and axial movement with respect thereto, a cutting tool mounted on said spindle, hydraulic actuating means for moving said spindle in an axial direction whereby said cutting tool may be positioned in cooperative relation to the surface of a workpiece, reciprocating means connected to said spindle for rocking said spindle, hydraulic actuated wedging means for positioning said cutting tool in any one of a plurality of radial positions with respect to said spindle, and resilient means for operating said last named means to retract said cutting tool when said hydraulic actuating wedging means are de-energized to move said spindle away from the surface of the workpiece.

5. A machine tool comprising a spindle, a cutting tool mounted on said spindle, clamping means for rigidly supporting a workpiece in cooperative relationship to said cutting tool, reciprocating means connected to said spindle for rocking said spindle thru a limited arc, said rocking motion comprising respectively a cutting stroke and a return stroke, a wedge member arranged to support said cutting tool in any one of a plurality of radially outwardly displaced positions relative to said spindle, hydraulic actuating means for advancing said wedge member by increments relative to said cutting tool, and solenoid controlled means for operating said last mentioned means at the beginning of each of said cutting strokes of said spindle.

6. A machine tool comprising a head portion, a spindle mounted in said head portion for rotatable and axial movement with respect thereto, a cutting tool mounted on said spindle, a first hydraulic actauting means for moving said spindle in an axial direction whereby said cutting tool may be positioned in cooperative relation to the surface of a workpiece, reciprocating means connected to said spindle for rocking said spindle, said cutting tool being movably mounted in said spindle for motion in a generally radially outward direction relative to said spindle, a wedge member movably mounted in said spindle in cooperative relationship to said cutting tool whereby said wedge member controls the radial position of said cutting tool relative to said spindle, a second hydraulic actuating means for advancing said wedge member with respect to said cutting tool, and control means interconnecting said first and second hydraulic means for operating said second hydraulic means to a wedge retracted position when said first hydraulic means is operated to move said spindle axially relative to the workpiece.

7. A machine tool comprising a head portion, a driving sleeve rotatably mounted in said head portion, a hollow cylindrical spindle body rotatably mounted within said driving sleeve, a spindle mounted within said spindle body, key means for securing said spindle to said spindle body for rotational movement but permitting axial movement of said spindle with respect to said spindle body, a cutting tool mounted on one end of said spindle, hydraulic actuating means for moving said spindle axially with respect to said spindle body whereby said cutting tool may be positioned in cooperative relationship to a workpiece, reciprocating means connected to said spindle for rocking said driving sleeve thru a limited arc, said spindle body having a plurality of peripherally spaced, radial holes therein, a locking pin associated with said driving sleeve and arranged to engage any selected one of said holes to thereby secure said spindle body to said driving sleeve in any selected one of a plurality of radial positions with respect thereto.

8. The combination defined in claim 7 and solenoid controlled hydraulic actuating means for controlling the position of said locking pin relative to said spindle body.

9. A machine tool comprising a spindle, a cutting tool mounted on said spindle, clamping means for rigidly supporting a workpiece in cooperative relationship to said cutting tool, reciprocating means connected to said spindle for rocking said spindle thru a limited arc, said rocking motion comprising respectively a cutting stroke and a return stroke, a wedge member arranged to support said cutting tool in any one of a plurality of radially outwardly displaced positions relative to said spindle, hydraulic actuating means for advancing said wedge member by increments relative to said cutting tool, solenoid controlled means for operating said last mentioned means at the beginning of each of said cutting strokes of said spindle, and resilient means for moving said wedge member to an inoperative position relative to said cutting tool at the beginning of each of said return strokes of said spindle.

10. A machine tool comprising a spindle, a cutting tool mounted on said spindle, clamping means for rigidly supporting a workpiece in cooperative relationship to said cutting tool, reciprocating means connected to said spindle for rocking said spindle thru a limited arc, said rocking motion comprising respectively a cutting stroke and a return stroke, a lead nut engageable with a threaded section of said spindle to impart a helical lead to the rotary movement thereof, hydraulic actuated wedging means for automatically advancing and supporting said cutting tool in a radially outwardly displaced position relative to said spindle at the start of said cutting stroke, and resilient means for automatically retracting said cutting tool radially inwardly relative to said spindle during said return stroke.

11. A cutting tool assembly for a machine tool comprising a spindle, a cutting tool movably mounted in said spindle for motion in a generally radially outward direction relative to said spindle, a first resilient means biasing said cutting tool radially inwardly, a first wedge surface on said cutting tool, a first wedge member movably mounted in said spindle in cooperative relationship to said first wedge surface, whereby said first wedge member controls the radial position of said cutting tool relative to said spindle, a second resilient means biasing said first wedge member to one extreme position permitting retraction of said cutting tool into said spindle, hydraulic actuating means for moving said first wedge member forcibly into engagement with said first wedge surface, a second wedge surface on said cutting tool, a second wedge member movably mounted in said spindle and cooperating with said second wedge surface to limit the outward movement of said cutting tool, and mechanical means for incrementally changing the position of said second wedge member relative to said cutting tool whereby said cutting tool may be progressively supported in a plurality of radial positions relative to said spindle.

12. The combination defined in claim 11 wherein said last mentioned means comprises a rack member abutting said second wedge member, a third resilient means biasing said second wedge member into engagement with said rack member, a pinion arranged to control the position of said rack, and solenoid controlled mechanical means for intermittently rotating said pinion unidirectionally whereby said rack is unidirectionally moved by increments relative to said second wedge member hence producing successive radial advancements of said cutting tool.

13. A machine tool comprising a head portion, a driving sleeve rotatably mounted in said head portion, a hollow cylindrical spindle body rotatably mounted within said driving sleeve, a spindle mounted within said spindle body, key means for securing said spindle to said spindle body for rotational movement but permitting axial movement of said spindle with respect to said spindle body, a cutting tool mounted on one end of said spindle, a pair of hydraulic cylinders disposed on opposite sides of said spindle having the ram portions thereof secured to said head portion, a yoke member with the cylinder portions secured thereon and provided with spaced-apart parallel bores constructed to slidably receive said ram portions, said spindle threadably secured to said yoke whereby said hydraulic cylinders may move said spindle axially with respect to said head portion to position said cutting tool in cooperative relationship to a workpiece, reciprocating means connected to said spinde for rocking said driving sleeve thru a limited arc, and solenoid controlled detent means for securing said spindle body to said driving sleeve.

14. A machine tool comprising a head portion, a driving sleeve rotatably mounted in said head portion, a hollow cylindrical spindle body rotatably mounted within said driving sleeve, a spindle mounted within said spindle body, key means for securing said spindle to said spindle body for rotational movement but permitting axial movement of said spindle with respect to said spindle body, a cutting tool mounted on one end of said spindle, a pair of hydraulic cylinders disposed on opposite sides of said spindle having the ram portions thereof secured to said head portion, a threaded section on said spindle, a threaded lead member engageable with said threaded spindle section, said threaded lead member being rigidly secured to the cylinder portions of said hydraulic cylinders whereby said hydraulic cylinders may move said spindle axially with respect to said head portion to position said cutting tool in cooperative relationship to a workpiece, reciprocating means connected to said spindle for rocking said driving sleeve thru a limited arc, and solenoid control detent means for securing said spindle body to said driving sleeve whereby said spindle reciprocates along a helical arc.

15. In a machine tool having a bed portion and a work table longitudinally movable thereon, the improvement comprising, in combination, a locking member mounted on said table for transverse movement with respect thereto, resilient means biasing said locking member to an outwardly projecting position with respect to said table, a stop member secured to said bed portion and arranged to be engaged by said locking member to secure said table to said bed portion against longitudinal movement, hydraulic actuated cam means for retracting said locking member, a wedge expansion member disposed between one side of said table and said bed portion, and means for expanding said wedge expansion member to secure said table to said bed portion against transverse movement.

16. In a machine tool having a bed portion and a work table longitudinally movable thereon, the improvement comprising, in combination, a spring biased locking member for locking said table to said bed portion against relative longitudinal movement, a longitudinally extending wedge surface on said table, a wedge member arranged between said wedge surface and said bed portion, a longitudinally extending control shaft mounted in said bed portion, and threaded means interconnecting said control shaft to said wedge member whereby rotation of said control shaft moves said wedge member relative to said wedge surface to lock said table against transverse movement relative to said table, said last mentioned means permitting relative longitudinal movement between said table and said control shaft.

17. In a machine tool having a bed portion and a work table longitudinally movable thereon, the improvement comprising, in combination, a spring biased locking member for locking said table to said bed portion against relative longitudinal movement, a longitudinally extending wedge surface on said table, a splined control shaft longitudinally mounted in said bed portion, an internally splined bushing slidably engaging said splined control shaft, means on said table for rotatably supporting said bushing, a wedge member arranged between said wedge surface and said bed portion, and a threaded connection between said bushing and said wedge member whereby rotation of said control shaft moves said wedge member relative to said wedge surface to lock said table against transverse movement relative to said table.

18. In a machine tool having a bed portion and a work table longitudinally movable thereon, the improvement comprising, in combination, a locking member mounted on said table for transverse movement with respect thereto, resilient means biasing said locking member to an outwardly projecting position with respect to said table, a stop member secured to said bed portion and arranged to be engaged by said locking member to secure said table to said bed portion against longitudinal movement, hydraulic actuated cam means for retracting said locking member, a splined control shaft longitudinally mounted in said bed portion, an internally splined bushing slidably engaging said splined control shaft, means on said table for rotatably supporting said bushing, a longitudinally extending wedge surface on said table, a wedge member arranged between said wedge surface and said bed portion, and a threaded connection between said bushing and said wedge member whereby rotation of said control shaft moves said wedge member relative to said wedge surface to lock said table against transverse movement relative to said table.

19. In a machine tool having a bed portion and a work table longitudinally movable thereon, the improvement comprising, in combination, a locking member mounted on said table for transverse movement with respect thereto, resilient means biasing said locking member to an outwardly projecting position with respect to said table, a stop member secured to said bed portion and arranged to be engaged by said locking member to secure said table to said bed portion against longitudinal movement, a cam roller on said locking member, a hydraulic ram secured to said table in longitudinal relation thereto, a cam member mounted on said ram and arranged to engage said cam roller and retract said locking member by longitudinal movement of said ram, and a surface on said table disposed in the path of said ram and engageable by further longitudinal movement of said ram after the retraction of said locking member whereby said table is moved longitudinally by said ram.

20. In a machine tool having a bed portion and a work table longitudinally movable thereon, the improvement comprising, in combination, a pair of longitudinally extending, oppositely inclined wedge surfaces on said table, a splined control shaft longitudinally mounted in said bed portion, an internally splined bushing slidably engaging said splined control shaft, a bearing member on said table rotatably supporting said bushing, a pair of wedge members respectively arranged between each of said wedge surfaces and said bed portion, threaded connections between said bushing and each of said wedge members, said threaded connections being of opposite hand, whereby rotation of said control shaft in one direction moves each said wedge member relative to its respective cooperating wedge surface to lock said table to said bed portion at any desired longitudinal position relative thereto and rotation of said control shaft in the opposite direction retracts said wedges to unlock said table from said bed portion.

21. A machine tool for operating upon stepped, arcuate interior surfaces of a workpiece comprising a head portion and a table portion, clamping means for securing a workpiece to said table portion, a spindle mounted in said head portion for oscillating and limited axial movement with respect thereto, a cutting tool secured to said spindle in radially projecting relation, hydraulic actuating means for moving said spindle axially to position said cutting tool in the interior of the workpiece, and means responsive to the angular position of said cutting tool relative to the stepped surfaces of the workpiece for preventing energization of said hydraulic actuating means unless said cutting tool is in proper angular alignment with the stepped surfaces of the workpiece.

22. The combination defined in claim 21 wherein said last mentioned means comprises a solenoid operated valve for said hydraulic actuating means, a switch connected in the control circuit of said solenoid, an actuating member provided on said switch having a portion thereof engaging the periphery of said spindle, and cam means on the periphery of said spindle arranged to operate said actuating member when said spindle assumes a predetermined angular position with respect thereto.

23. A machine tool comprising, in combination, a spindle, a cutting tool movably mounted in said spindle for motion in a generally radially outward direction relative to said spindle, a wedge member movably mounted in said spindle in cooperative relationship to said cutting tool whereby said wedge member controls the radial position of said cutting tool relative to said spindle, reciprocating means connected to said spindle for rocking said spindle thru a limited arc, said rocking motion comprising respectively a cutting stroke and a return stroke, hydraulic actuating means for forcing said wedge member into engagement with said cutting tool during each cutting stroke, a stop member limiting the outward movement of said cutting tool, and mechanical means for incrementally changing the position of said stop member relative to said cutting tool whereby said cutting tool may be supported in a plurality of progressively displaced radial positions relative to said spindle.

24. A machine tool comprising, in combination, a spindle, a cutting tool movably mounted in said spindle for motion in a generally radially outward direction relative to said spindle, a wedge member movably mounted in said spindle in cooperative relationship to said cutting tool whereby said wedge member controls the radial position of said cutting tool relative to said spindle, reciprocating means connected to said spindle for rocking said spindle thru a limited arc, said rocking motion comprising respectively a cutting stroke and a return stroke, hydraulic actuating means for forcing said wedge member into engagement with said cutting tool during each cutting stroke, resilient means for moving said wedge member to a retracted position relative to said cutting tool prior to each return stroke, a stop member mounted on said spindle limiting the outward movement of said cutting tool with respect to the spindle, mechanical means for incrementally changing the position of said stop member relative to said cutting tool whereby said cutting tool may be supported in a plurality of progressively displaced radial positions relative to said spindle, and solenoid controlled means for operating said last mentioned means only when said wedge member reaches its said retracted position.

25. A machine tool comprising in combination, a spindle, a crankshaft provided with a connecting rod assembled thereon, said connecting rod arranged to rock said spindle thru a limited arc, said rocking motion comprising respectively a cutting stroke and a return stroke, a cutting tool movably mounted in said spindle for motion in a general radially outward direction relative to said spindle, resilient means biasing said cutting tool radially inwardly, a wedge surface on said cutting tool, a wedge member movably mounted on said spindle in cooperative relationship to said wedge surface whereby said wedge member may move said cutting tool radially outwardly relative to said spindle, a hydraulic cylinder provided with a piston and mounted below said cutting tool, said piston arranged to move said wedge member forcibly into engagement with said wedge surface of said cutting tool, hydraulic actuated means for energizing said piston during said cutting stroke and de-energizing said piston during said return stroke, an electric switch operated by return of said cutting tool to its retracted position with respect to the spindle, a stop member mounted in said spindle to limit the outward movement of said cutting tool, and mechanical means for incrementally changing the position of said stop member relative to said cutting tool whereby said cutting tool may be supported by said wedge member in a plurality of progressively advanced radial positions relative to said spindle, said mechanical means being responsive to operation of said electric switch, whereby said mechanical means is operated during each return stroke following the return of said cutting tool to its retracted position.

26. The combination defined in claim 25 wherein said mechanical means comprises a rack member engaging said stop member and controlling the position thereof, a pinion arranged to control the position of said rack, and a solenoid operated by said electrical switch for intermittently rotating said pinion unidirectionally whereby said rack is unidirectionally moved by increments relative to said stop.

27. A machine tool comprising a head portion, a spindle mounted in said head portion for rotatable and axial movement with respect thereto, a cutting tool mounted near the end of the spindle, clamping means for rigidly supporting a workpiece on the machine, hydraulic actuating means for advancing said spindle in an axial direction relative to said head portion whereby said cutting tool may be positioned in cooperative relation with respect to a surface of the workpiece, hydraulic actuated wedging means for supporting said cutting tool end of said spindle in its axially advanced position, and reciprocating means connected to said spindle for rocking said spindle whereby said cutting tool produces an arcuate cut on the surface of the workpiece.

28. A machine tool comprising a table, a head portion overlying said table, a spindle mounted in said head portion for rotatable and axial movement with respect thereto, a cutting tool mounted on the bottom portion of said spindle, a work holding fixture mounted on said table and arranged to support a workpiece, a first hydraulic actuated means for advancing said spindle in an axial direction relative to said head portion whereby said cutting tool may be positioned in cooperative relation with respect to a surface of the workpiece, said fixture including a second hydraulic actuated means for supporting the bottom end of said spindle in its axially advanced position, and reciprocating means connected to said spindle for rocking said spindle whereby said cutting tool produces an arcuate cut on the surface of the workpiece.

ALBERT S. GINSBURG.

REFERENCES CITED

The following references are of record in the file of this patent:

UNITED STATES PATENTS

| Number | Name | Date |
|---|---|---|
| 252,068 | Walworth | Jan. 10, 1882 |
| 512,542 | Forbes | Jan. 9, 1894 |
| 1,556,784 | Greenleaf | Oct. 13, 1925 |
| 1,707,421 | Wilson | Apr. 2, 1929 |
| 1,747,111 | Galloway | Feb. 11, 1930 |
| 1,899,865 | Hall | Feb. 28, 1933 |
| 1,926,358 | Waytich | Sept. 12, 1933 |
| 2,008,757 | Hall | July 23, 1935 |
| 2,257,364 | Bakewell | Sept. 30, 1941 |
| 2,271,768 | Johnson #1 | Feb. 3, 1942 |
| 2,286,477 | Falls | June 16, 1942 |
| 2,287,559 | Nye | June 23, 1942 |
| 2,294,184 | Johnson #2 | Aug. 25, 1942 |
| 2,311,591 | Groene et al. | Feb. 16, 1943 |
| 2,318,177 | Mathias | May 4, 1943 |
| 2,318,305 | Groene | May 4, 1943 |
| 2,322,127 | Groene | June 15, 1943 |
| 2,356,097 | Stanley | Aug. 15, 1944 |
| 2,368,359 | Hellstrom | Jan. 30, 1945 |
| 2,370,218 | Young | Feb. 27, 1945 |
| 2,376,164 | Miller et al. | May 15, 1945 |